United States Patent
Nakamura

(10) Patent No.: US 8,498,057 B2
(45) Date of Patent: Jul. 30, 2013

(54) ZOOM LENS SYSTEM AND ELECTRONIC IMAGING APPARATUS

(75) Inventor: Toshiki Nakamura, Tokyo (JP)

(73) Assignee: Hoya Corporation, Tokyo (JP)

( * ) Notice: Subject to any disclaimer, the term of this patent is extended or adjusted under 35 U.S.C. 154(b) by 70 days.

(21) Appl. No.: 13/198,042

(22) Filed: Aug. 4, 2011

(65) Prior Publication Data

US 2012/0069451 A1  Mar. 22, 2012

(30) Foreign Application Priority Data

Sep. 21, 2010  (JP) ................. 2010-211398

(51) Int. Cl.
*G02B 15/14* (2006.01)
(52) U.S. Cl.
USPC ........................................... 359/684
(58) Field of Classification Search
USPC ................... 359/689, 676, 680–682
See application file for complete search history.

(56) References Cited

U.S. PATENT DOCUMENTS

| 2007/0171544 | A1 | 7/2007 | Noda |
| 2008/0198483 | A1 | 8/2008 | Tomioka |
| 2009/0091843 | A1* | 4/2009 | Ohata ........................... 359/689 |
| 2010/0128364 | A1* | 5/2010 | Agatsuma ..................... 359/689 |

FOREIGN PATENT DOCUMENTS

| JP | 2007-193140 | 8/2007 |
| JP | 2008-233499 | 10/2008 |
| JP | 2008-233871 | 10/2008 |
| JP | 2009-92740 | 4/2009 |

* cited by examiner

*Primary Examiner* — James Greece
(74) *Attorney, Agent, or Firm* — Greenblum & Bernstein, P.L.C.

(57) ABSTRACT

A zoom lens system includes a negative first lens group, a positive second lens group and a positive third lens group, in that order from the object side. Upon zooming from the short to long focal length extremities, the distance between the first and second lens groups decreases, and the distance between the second and third lens groups increases. The first lens group includes a negative lens element and a positive lens element; and the second lens group includes a cemented lens including a positive lens element and a negative lens element, and a negative lens element, in that order from the object side. The following conditions are satisfied by the zoom lens system:

$$1.8 < ft/f2 < 2.4$$

$$-1.5 < f1/f2 < -1.2$$

wherein ft designates the focal length of the entire the zoom lens system at the long focal length extremity, and f1 and f2 designate the focal lengths of the first and second lens groups, respectively.

15 Claims, 25 Drawing Sheets

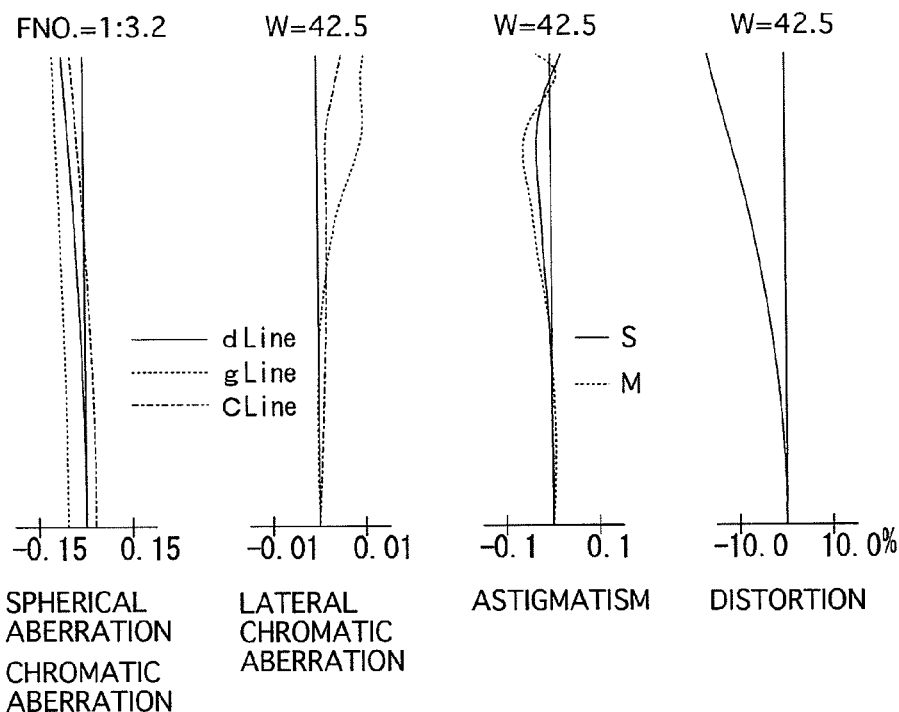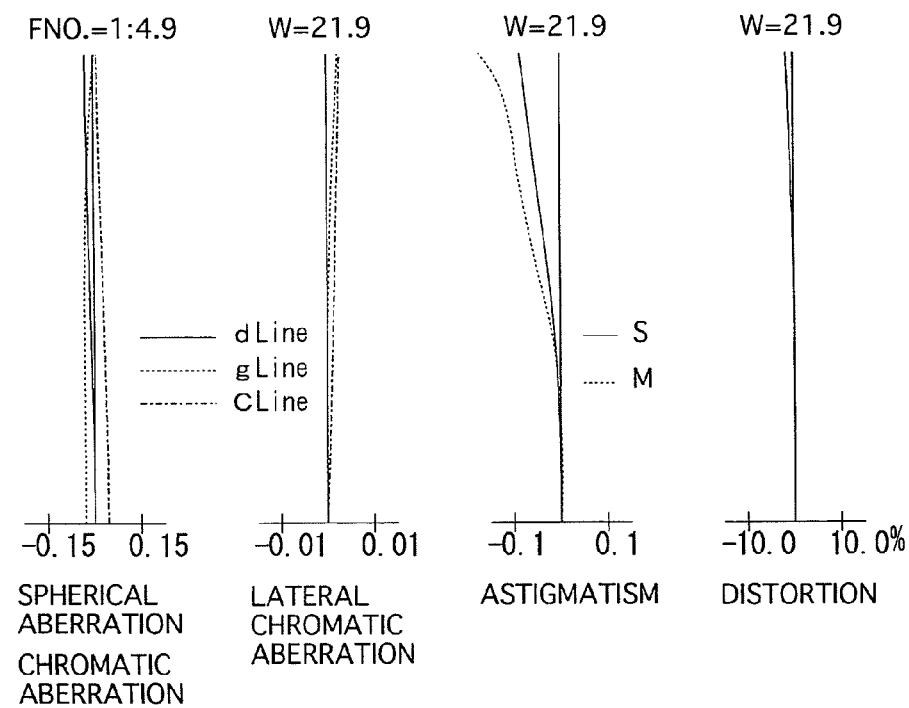

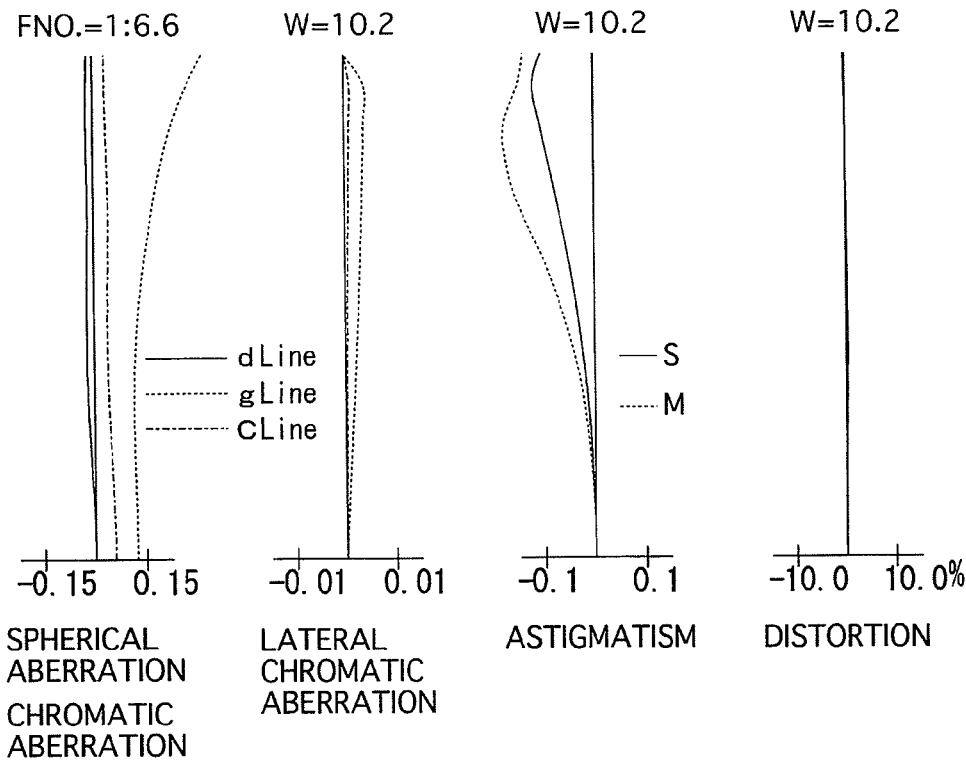

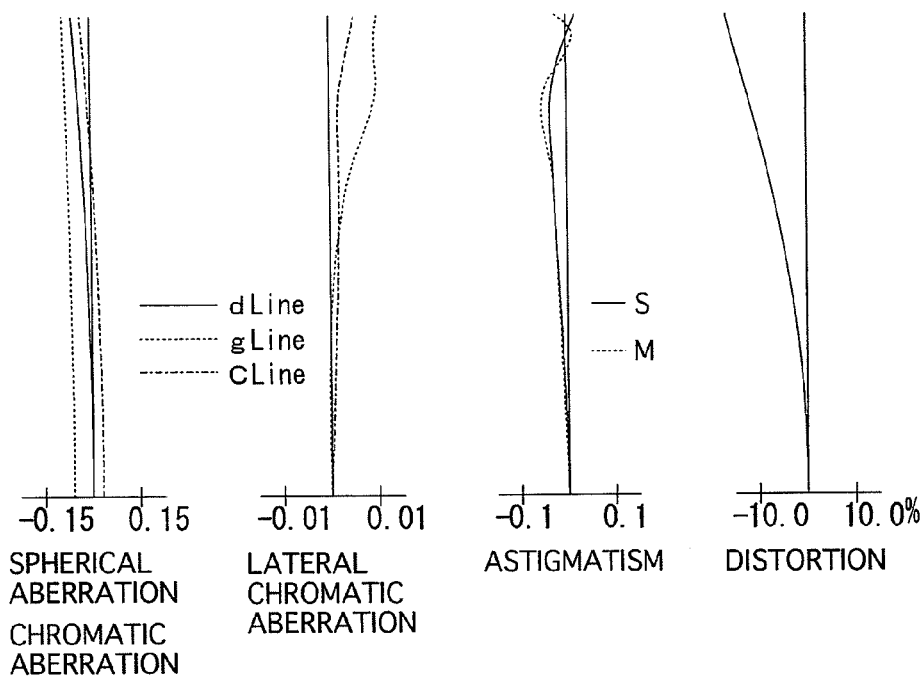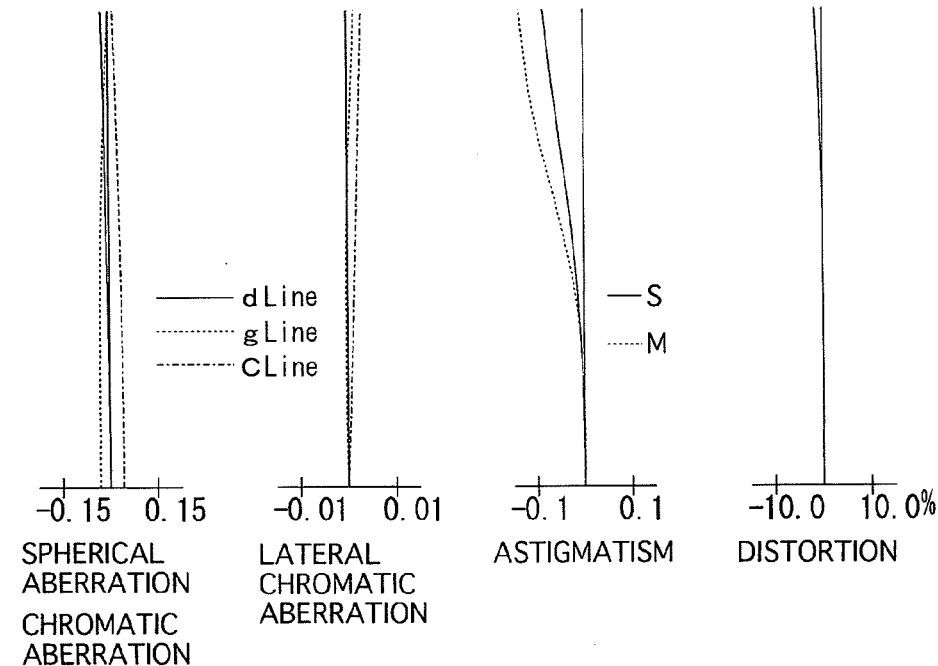

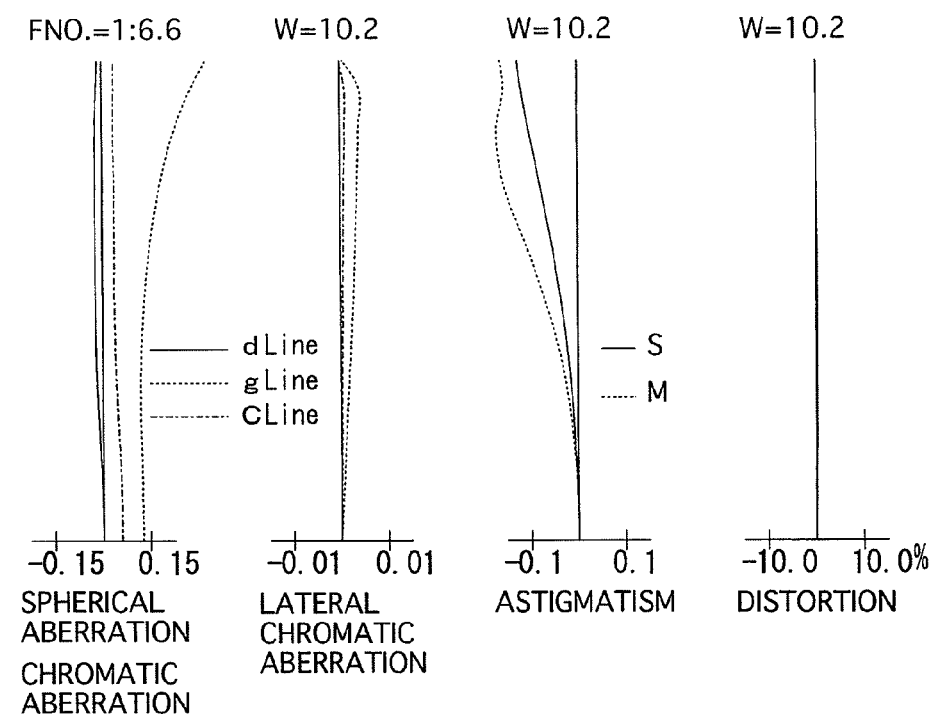

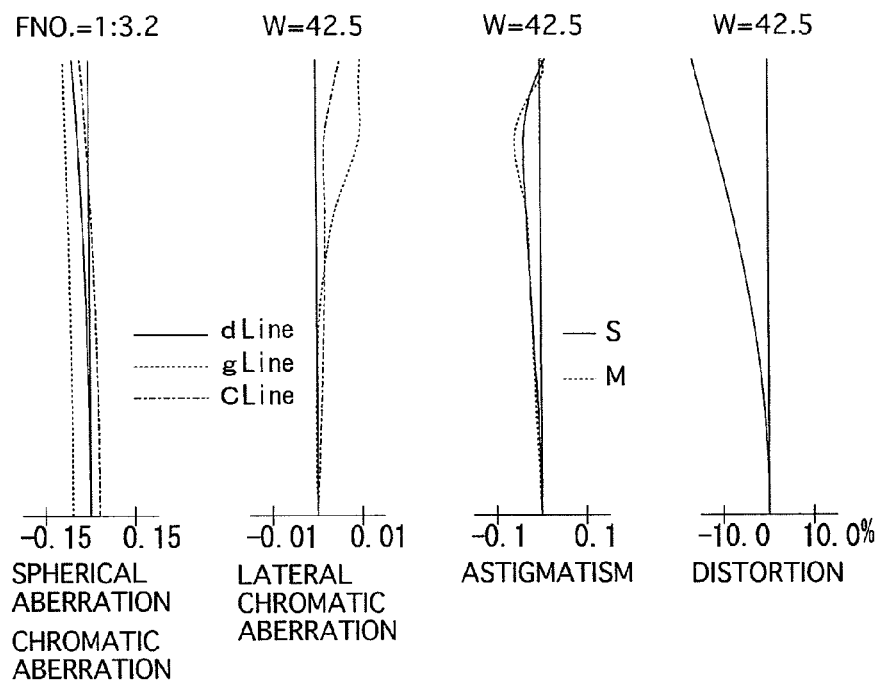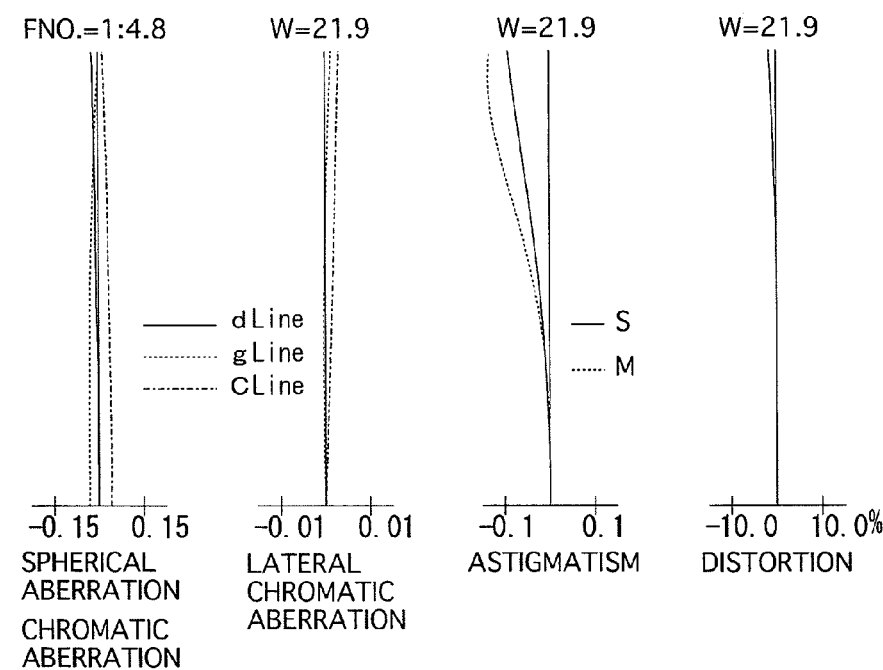

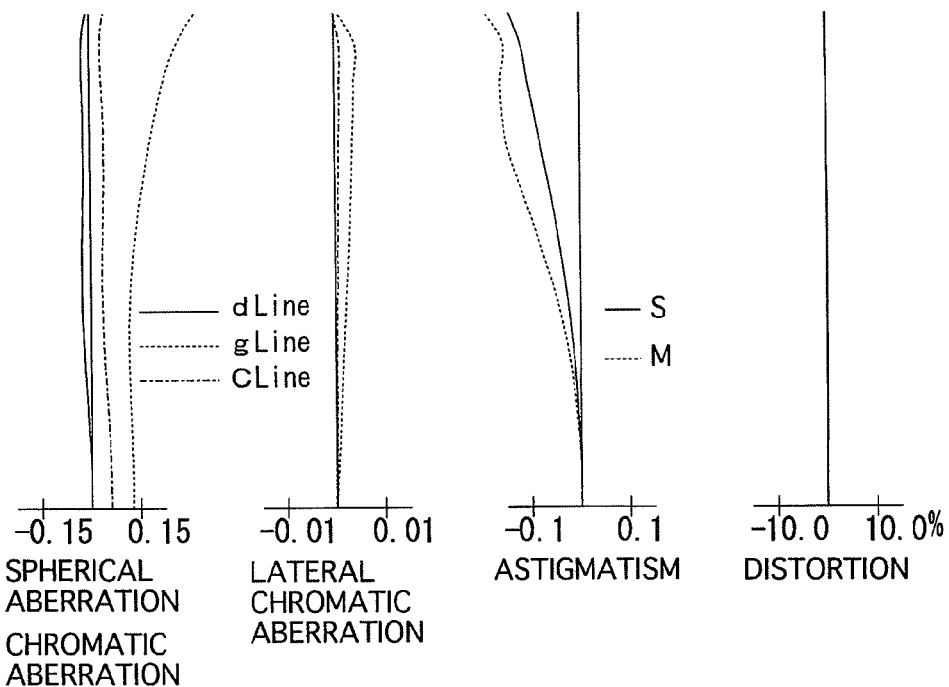

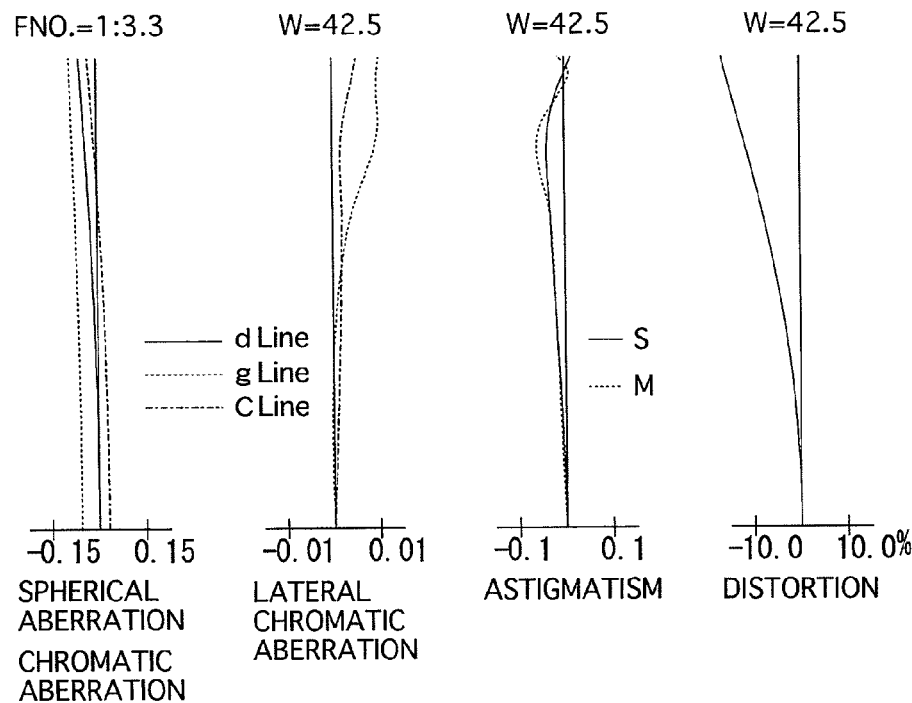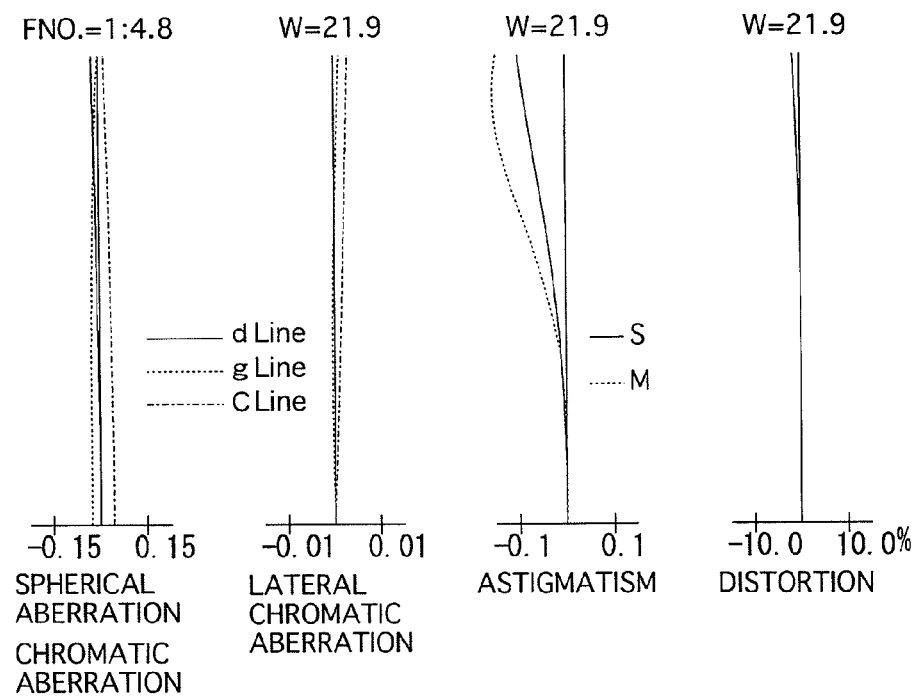

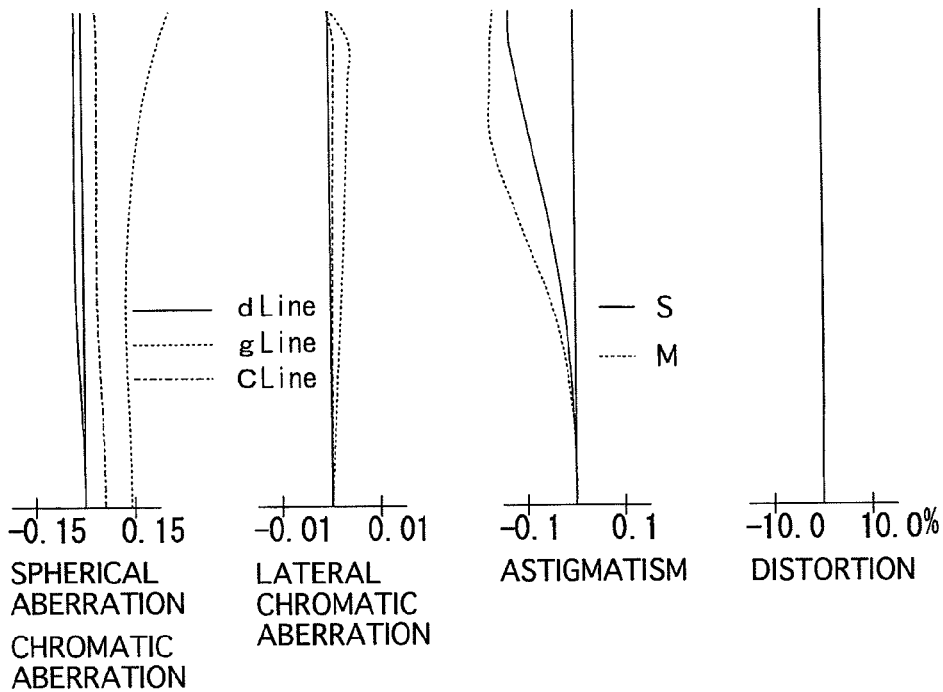

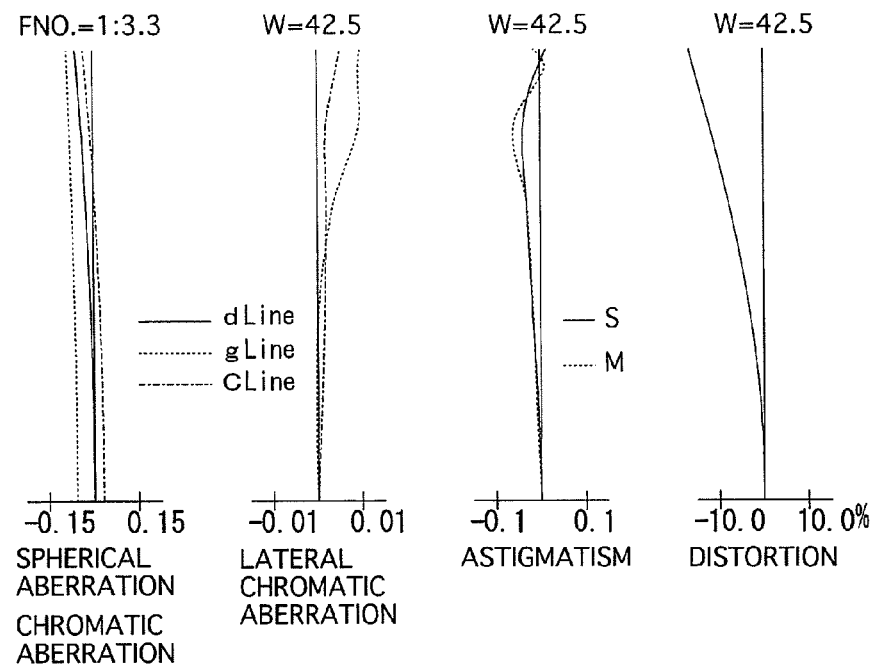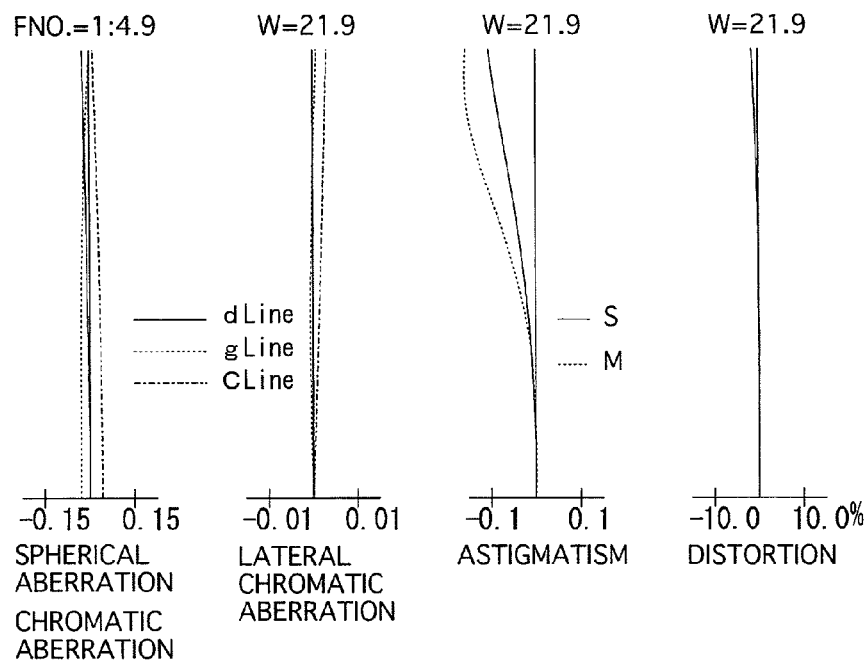

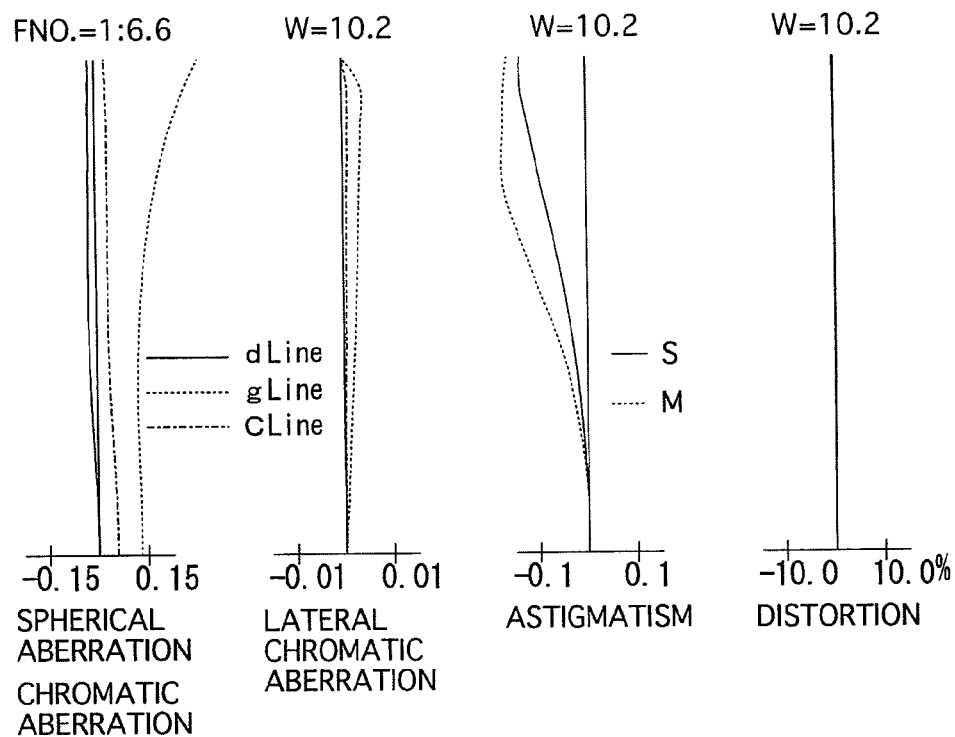

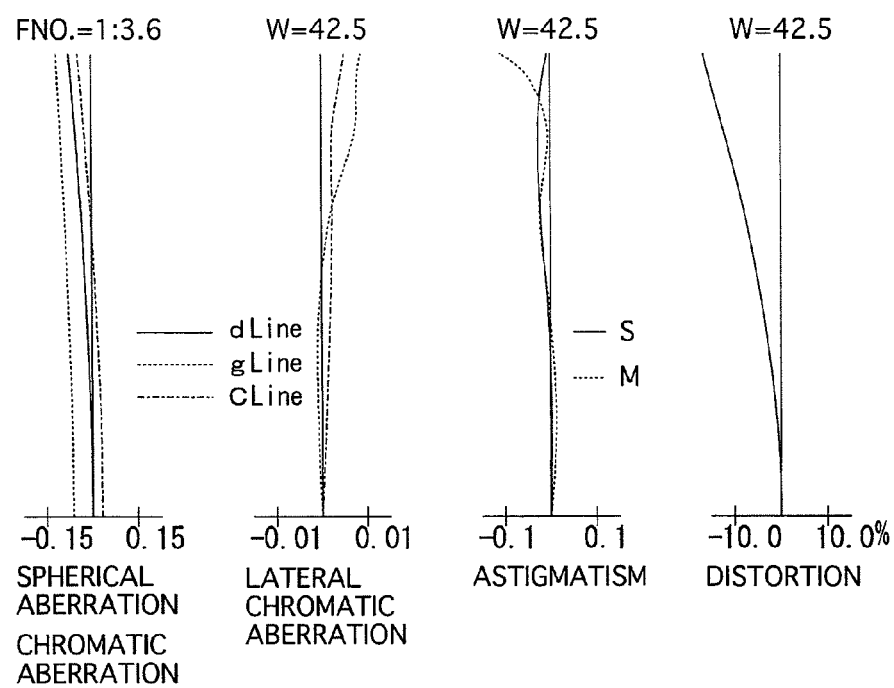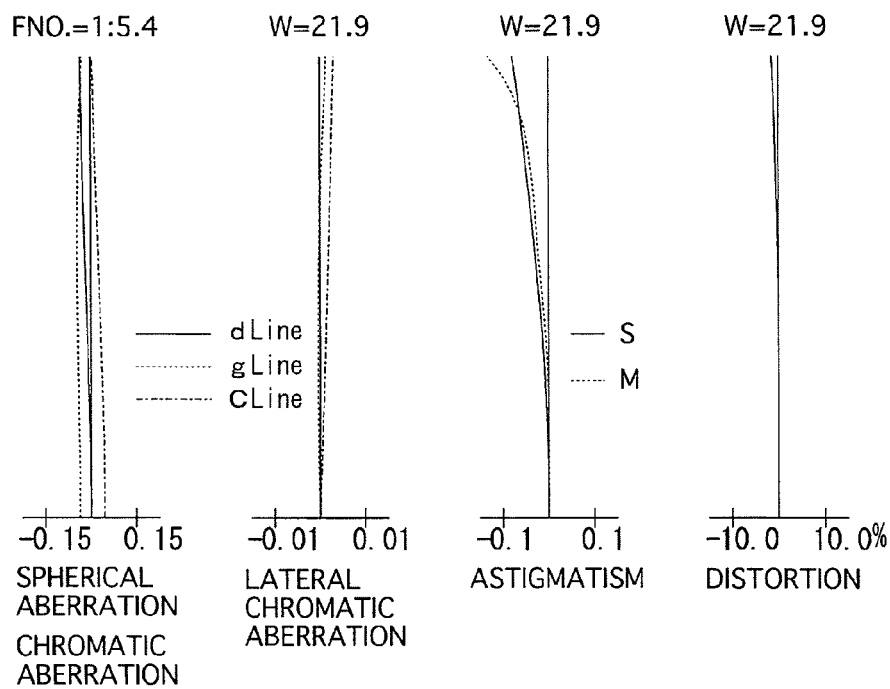

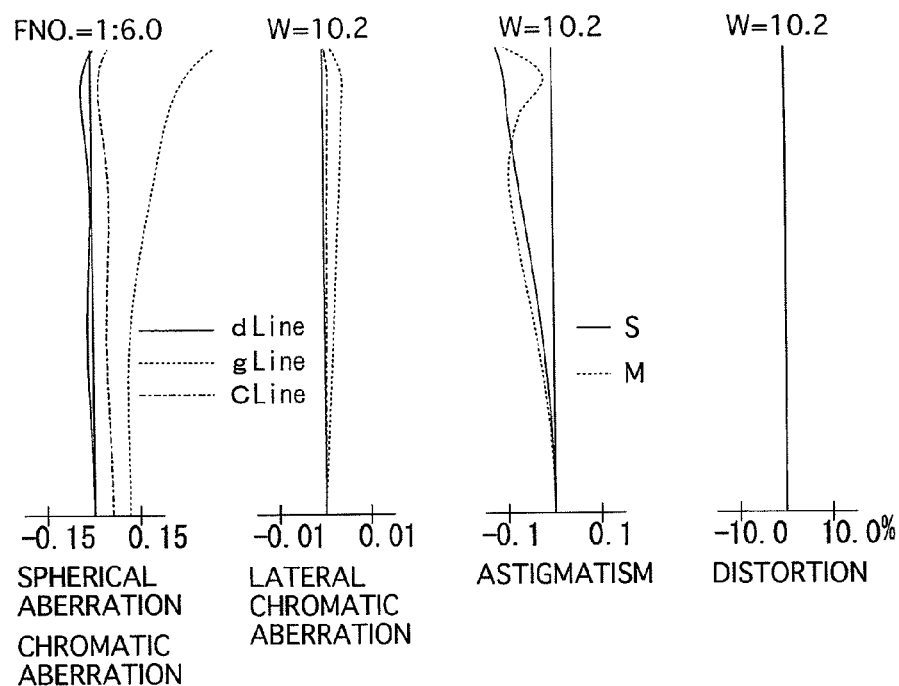

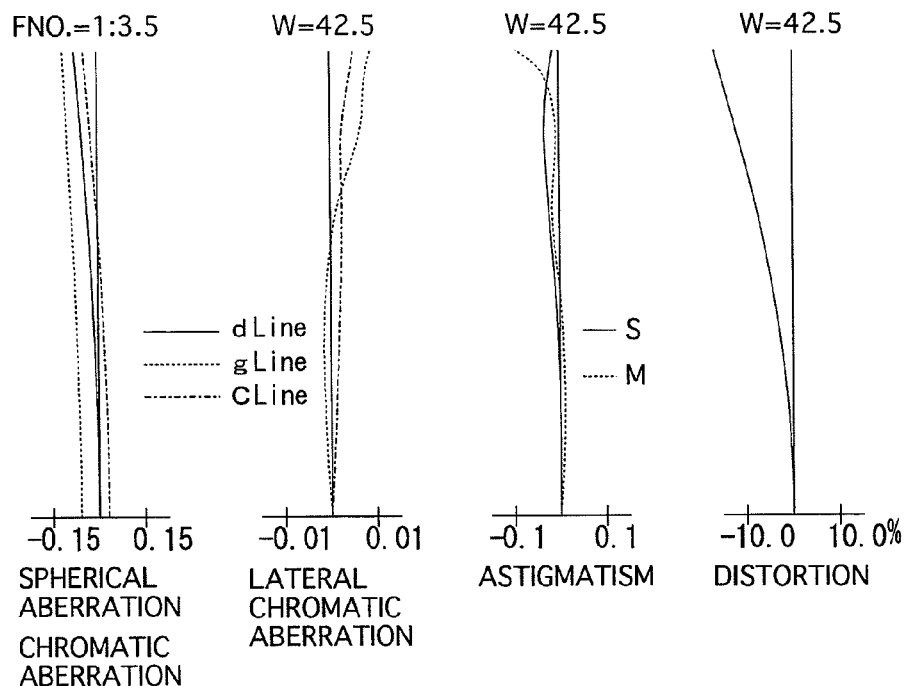
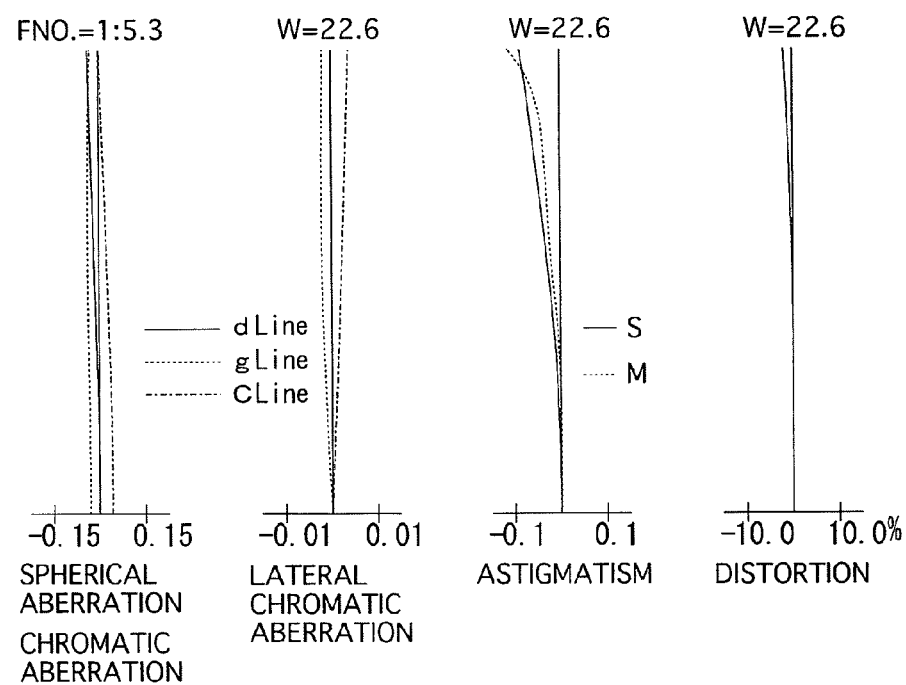

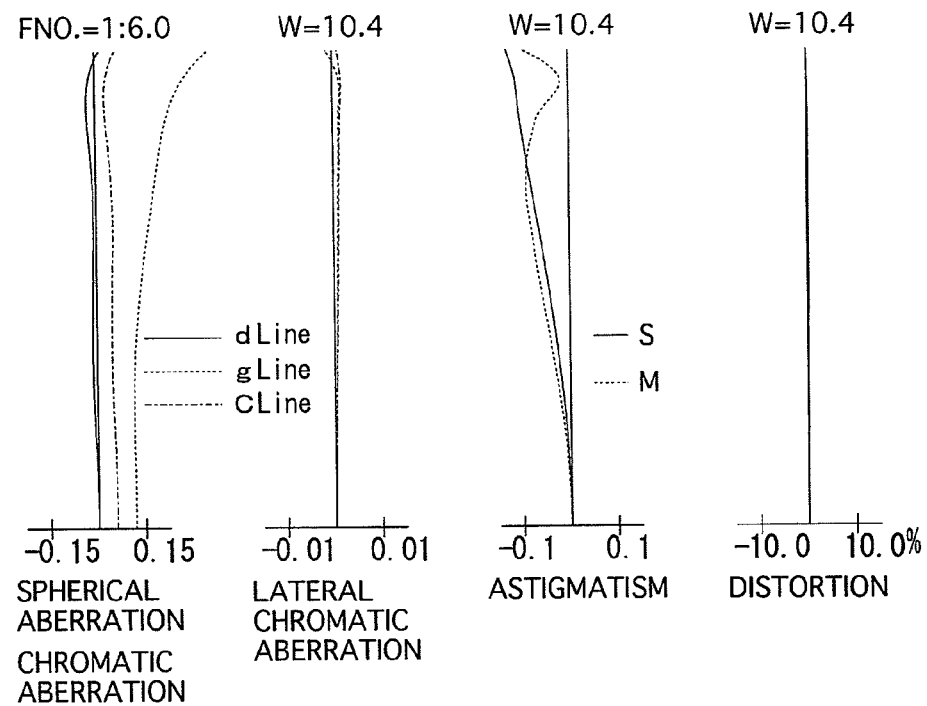

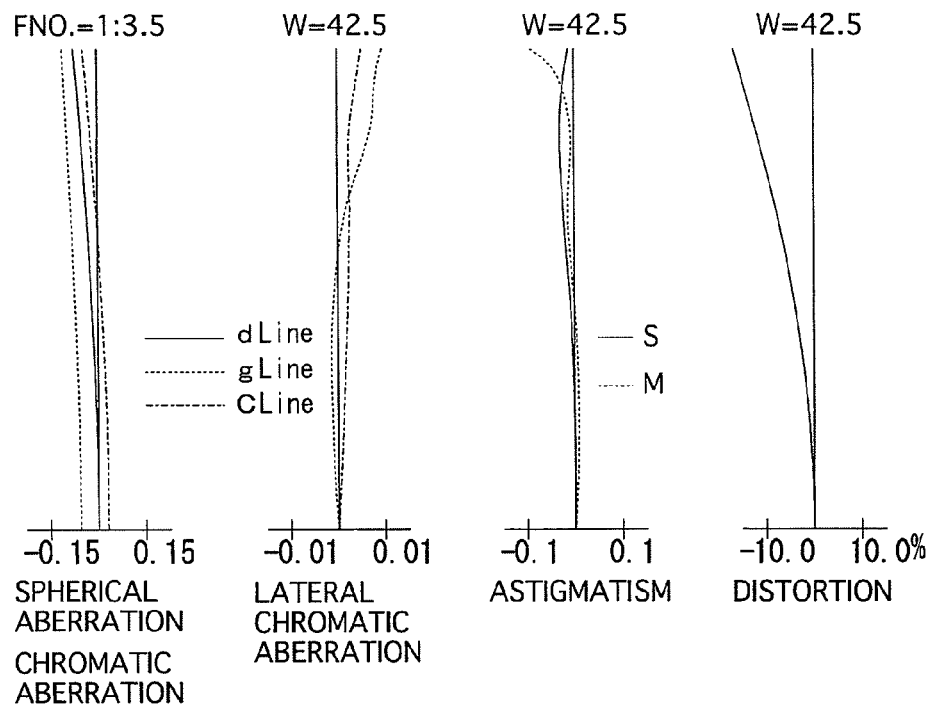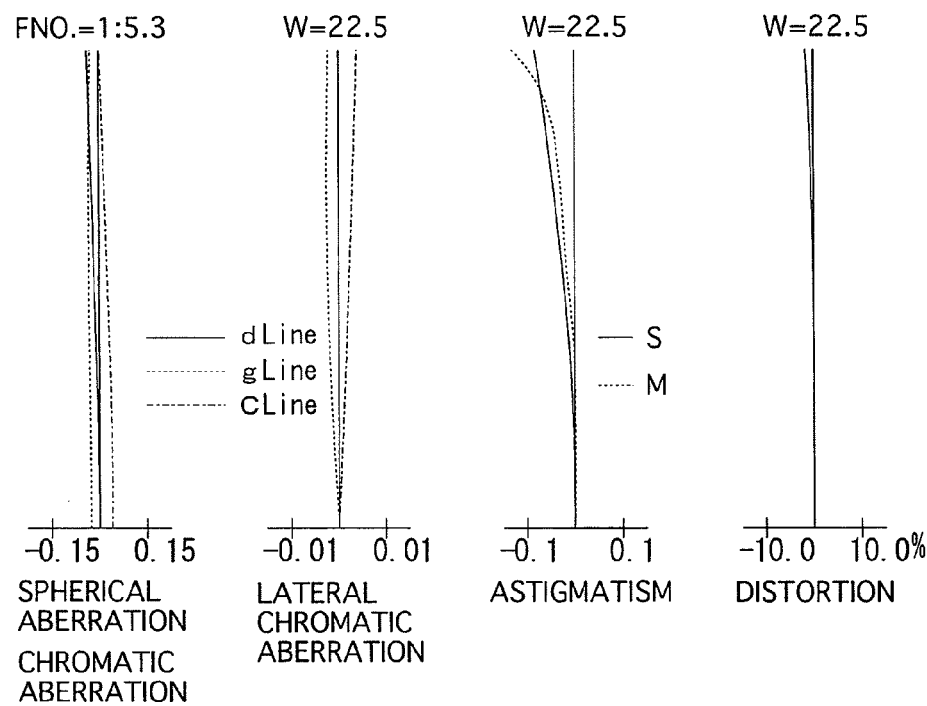

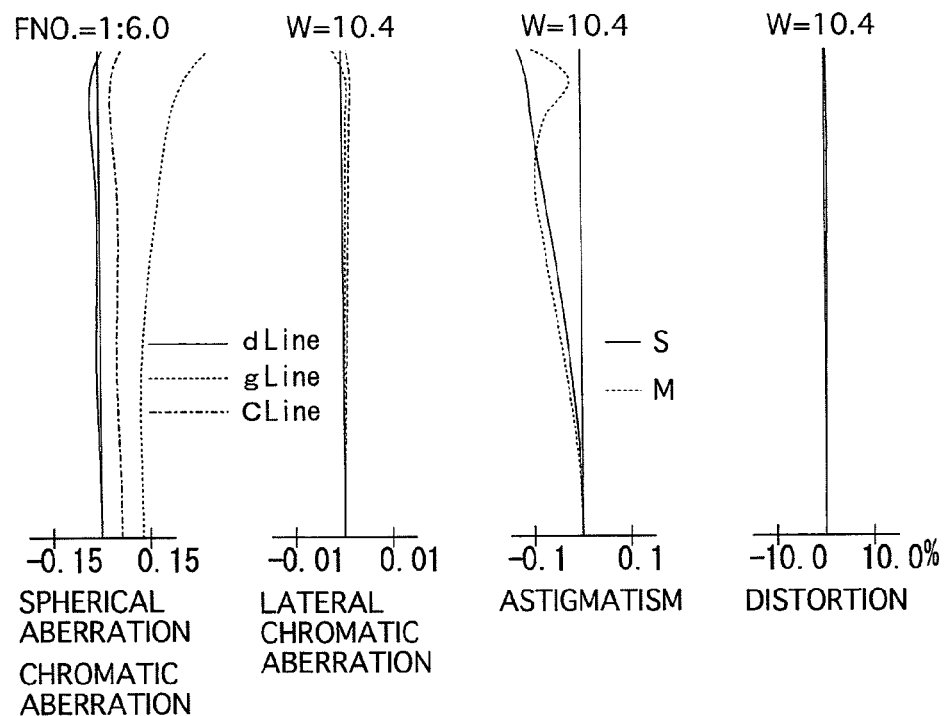

ZOOM LENS SYSTEM AND ELECTRONIC IMAGING APPARATUS

BACKGROUND OF THE INVENTION

1. Field of the Invention

The present invention relates to a low-cost zoom lens system having a zoom ratio of approximately 5:1 for use in a compact, light-weight digital camera, and also relates to an electronic imaging apparatus which employs such a zoom lens system.

2. Description of Related Art

Due to rapid popularization of digital cameras in recent years, demands are being made for lower-cost digital cameras, and also there is a strong demand for a lower-cost photographic optical system therefor. Whereas, there is a strong demand for an increased zoom ratio in order to increase the added value of the camera, so that a zoom lens system having a zoom ratio of approximately 5:1 is demanded, even in a low-cost digital camera.

For instance, a positive-lead zoom lens system configured of four lens groups is often employed as a zoom lens system having a zoom ratio exceeding 5:1. However, although such a type of zoom lens system is suitable for achieving a high zoom ratio, since the number of lens elements is large, it is difficult to achieve a low cost and miniaturized zoom lens system.

Whereas, zoom lens systems, in the form of a negative-lead zoom lens system having three lens groups, which achieve a lowered cost by employing a large number of resin lens elements are known in the art (e.g., Japanese Unexamined Patent Publication Nos. 2007-193140, 2008-233499, 2008-233871 and 2009-092740). However, each of these publications only discloses a zoom lens system having zoom ratio of approximately 3:1, which does not sufficiently achieve a high zoom ratio.

SUMMARY OF THE INVENTION

The present invention provides a zoom lens system which has a zoom ratio of approximately 5:1, is low-cost, compact (miniaturized), and can favorably correct various aberrations, while being configured of a negative-lead zoom lens system having three lens groups.

According to an aspect of the present invention, a zoom lens system is provided, including a negative first lens group, a positive second lens group and a positive third lens group, in that order from the object side, wherein upon zooming from the short focal length extremity to the long focal length extremity, each of the first through third lens groups move along the optical axis thereof so that the distance between the first lens group and the second lens group decreases, and the distance between the second lens group and the third lens group increases. The first lens group includes a negative lens element and a positive lens element, in that order from the object side. The second lens group includes a cemented lens formed from a positive lens element and a negative lens element; and a negative lens element, in that order from the object side. The following conditions (1) and (2) are satisfied:

$$1.8 < ft/f2 < 2.4 \quad (1),$$

$$-1.5 < f1/f2 < -1.2 \quad (2),$$

wherein ft designates the focal length of the entire the zoom lens system at the long focal length extremity, f1 designates the focal length of the first lens group, and f2 designates the focal length of the second lens group.

It is desirable for the positive lens element which is provided in the first lens group to be a resin lens element having an aspherical surface on at least one side thereof, and for the negative lens element which is provided on the image side within the second lens group to be a resin lens element having an aspherical surface on at least one side thereof.

It is desirable for the following condition (3) to be satisfied:

$$-2.5 < f12/f23 < -1.3 \quad (3),$$

wherein f12 designates the focal length of the positive lens element which is provided in the first lens group, and f23 designates the focal length of the negative lens element which is provided on the image side within the second lens group.

It is desirable for the following condition (4) to be satisfied:

$$-2.4 < f12/f1 < -1.8 \quad (4),$$

wherein f12 designates the focal length of the positive lens element which is provided in the first lens group, and f1 designates the focal length of the first lens group.

It is desirable for the following condition (5) to be satisfied:

$$2.5 < (ra23 + rb23)/(ra23 - rb23) < 4.5 \quad (5),$$

wherein ra23 designates the radius of curvature of the surface on the object side of the negative lens element which is provided on the image side within the second lens group, and rb23 designates the radius of curvature of the surface on the image side of the negative lens element which is provided on the image side within the second lens group.

It is desirable for the following conditions (6) and (7) to be satisfied:

$$1.8 < n21 \quad (6), \text{ and}$$

$$v22 < 22 \quad (7),$$

wherein n21 designates the refractive index at the d-line of the positive lens element which is provided in the second lens group, and v22 designates the Abbe number with respect to the d-line of the negative lens element which is provided on the object side within the second lens group.

It is desirable for the third lens group to move toward the image side upon zooming from the short focal length extremity to the long focal length extremity, and wherein the following conditions (8) and (9) are satisfied:

$$4.0 < m2t/m2w < 5.0 \quad (8), \text{ and}$$

$$1.05 < m3t/m3w < 1.25 \quad (9),$$

wherein m2t designates the lateral magnification of the second lens group when focused on an object at infinity, at the long focal length extremity, m2w designates the lateral magnification of the second lens group when focused on an object at infinity, at the short focal length extremity, m3t designates the lateral magnification of the third lens group when focused on an object at infinity, at the long focal length extremity, and m3w designates the lateral magnification of the third lens group when focused on an object at infinity, at the short focal length extremity.

It is desirable for the third lens group to be a focusing lens group which is moved along the optical axis direction during a focusing operation, and is a single biconvex positive resin lens element having an aspherical surface on at least one side thereof.

In an embodiment, an electronic imaging apparatus including the above-described zoom lens system is provided.

According to the present invention, a zoom lens system which has a zoom ratio of approximately 5:1, is low-cost, compact (miniaturized), and can favorably correct various aberrations, while being configured of a negative-lead zoom lens system having three lens groups, can be achieved.

The present disclosure relates to subject matter contained in Japanese Patent Application No. 2010-211398 (filed on Sep. 21, 2010) which is expressly incorporated herein in its entirety.

BRIEF DESCRIPTION OF THE DRAWINGS

The present invention will be discussed below in detail with reference to the accompanying drawings, in which:

FIGS. 2A, 2B, 2C and 2D show various aberrations that occurred in the lens arrangement shown in FIG. 1 when focused on an object at infinity at the short focal length extremity;

FIGS. 3A, 3B, 3C and 3D show various aberrations that occurred in the lens arrangement shown in FIG. 1 when focused on an object at infinity at an intermediate focal length;

FIGS. 4A, 4B, 4C and 4D show various aberrations that occurred in the lens arrangement shown in FIG. 1 when focused on an object at infinity at the long focal length extremity;

FIGS. 6A, 6B, 6C and 6D show various aberrations that occurred in the lens arrangement shown in FIG. 5 when focused on an object at infinity at the short focal length extremity;

FIGS. 7A, 7B, 7C and 7D show various aberrations that occurred in the lens arrangement shown in FIG. 5 when focused on an object at infinity at an intermediate focal length;

FIGS. 8A, 8B, 8C and 8D show various aberrations that occurred in the lens arrangement shown in FIG. 5 when focused on an object at infinity at the long focal length extremity;

FIGS. 10A, 10B, 10C and 10D show various aberrations that occurred in the lens arrangement shown in FIG. 9 when focused on an object at infinity at the short focal length extremity;

FIGS. 11A, 11B, 11C and 11D show various aberrations that occurred in the lens arrangement shown in FIG. 9 when focused on an object at infinity at an intermediate focal length;

FIGS. 12A, 12B, 12C and 12D show various aberrations that occurred in the lens arrangement shown in FIG. 9 when focused on an object at infinity at the long focal length extremity;

FIGS. 14A, 14B, 14C and 14D show various aberrations that occurred in the lens arrangement shown in FIG. 13 when focused on an object at infinity at the short focal length extremity;

FIGS. 15A, 15B, 15C and 15D show various aberrations that occurred in the lens arrangement shown in FIG. 13 when focused on an object at infinity at an intermediate focal length;

FIGS. 16A, 16B, 16C and 16D show various aberrations that occurred in the lens arrangement shown in FIG. 13 when focused on an object at infinity at the long focal length extremity;

FIGS. 18A, 18B, 18C and 18D show various aberrations that occurred in the lens arrangement shown in FIG. 17 when focused on an object at infinity at the short focal length extremity;

FIGS. 19A, 19B, 19C and 19D show various aberrations that occurred in the lens arrangement shown in FIG. 17 when focused on an object at infinity at an intermediate focal length;

FIGS. 20A, 20B, 20C and 20D show various aberrations that occurred in the lens arrangement shown in FIG. 17 when focused on an object at infinity at the long focal length extremity;

FIGS. 22A, 22B, 22C and 22D show various aberrations that occurred in the lens arrangement shown in FIG. 21 when focused on an object at infinity at the short focal length extremity;

FIGS. 23A, 23B, 23C and 23D show various aberrations that occurred in the lens arrangement shown in FIG. 21 when focused on an object at infinity at an intermediate focal length;

FIGS. 24A, 24B, 24C and 24D show various aberrations that occurred in the lens arrangement shown in FIG. 21 when focused on an object at infinity at the long focal length extremity;

FIGS. 26A, 26B, 26C and 26D show various aberrations that occurred in the lens arrangement shown in FIG. 25 when focused on an object at infinity at the short focal length extremity;

FIGS. 27A, 27B, 27C and 27D show various aberrations that occurred in the lens arrangement shown in FIG. 25 when focused on an object at infinity at an intermediate focal length;

FIGS. 28A, 28B, 28C and 28D show various aberrations that occurred in the lens arrangement shown in FIG. 25 when focused on an object at infinity at the long focal length extremity;

FIGS. 30A, 30B, 30C and 30D show various aberrations that occurred in the lens arrangement shown in FIG. 29 when focused on an object at infinity at the short focal length extremity;

FIGS. 31A, 31B, 31C and 31D show various aberrations that occurred in the lens arrangement shown in FIG. 29 when focused on an object at infinity at an intermediate focal length;

FIGS. 32A, 32B, 32C and 32D show various aberrations that occurred in the lens arrangement shown in FIG. 29 when focused on an object at infinity at the long focal length extremity.

DESCRIPTION OF THE EMBODIMENTS

Figure 33:
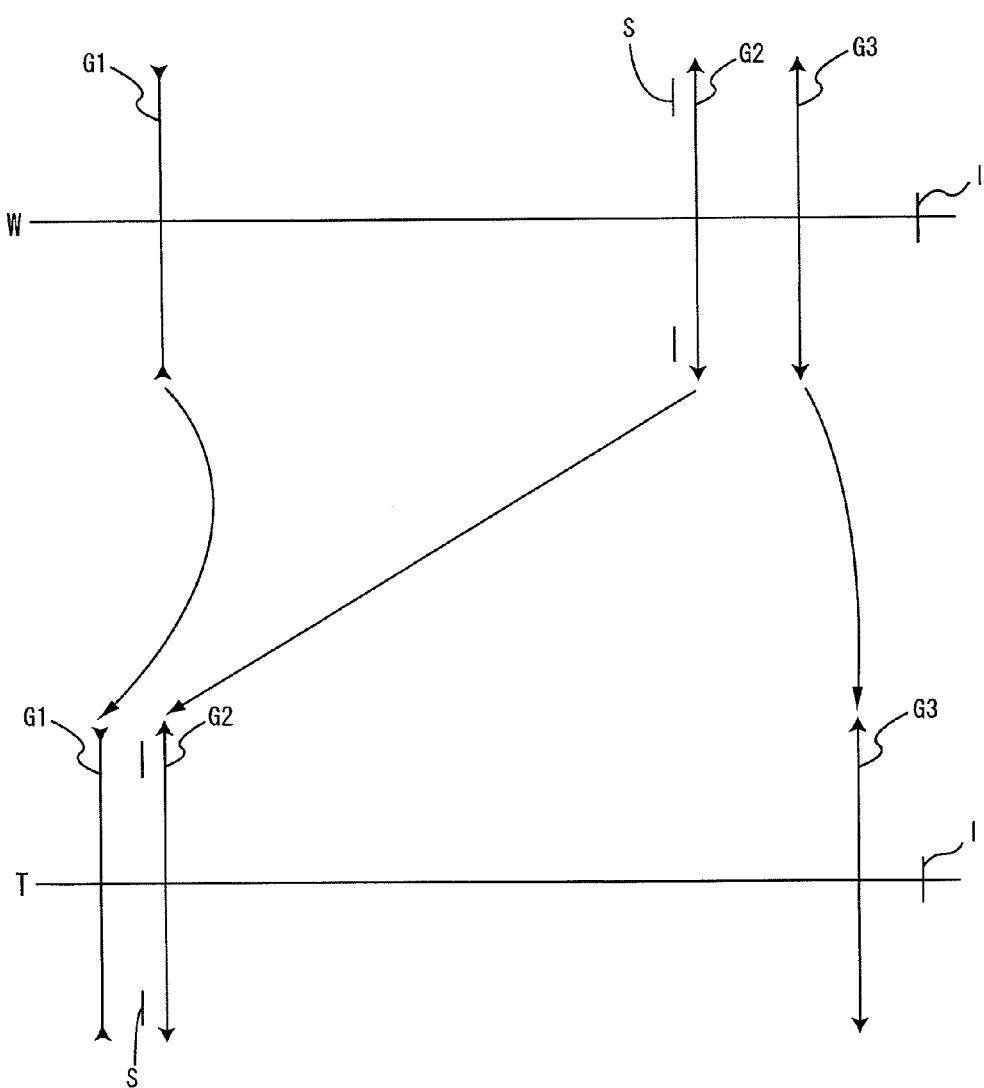
FIG. 33 shows a zoom path of the zoom lens system according to the present invention.

The zoom lens system according to the present invention, as shown in the zoom path of FIG. 33, is configured of a negative first lens group G1, a positive second lens group G2, and a positive third lens group G3, in that order from the object side. A diaphragm S, which is provided between the first lens group G1 and the second lens group G2, moves integrally with the second lens group G2 along the optical axis direction. Focusing is carried out by the third lens group G3. In FIG. 33, 'I' designates the imaging plane.

Upon zooming from the short focal length extremity (W) to the long focal length extremity (T), the first through third lens groups 1G through 3G move along the optical axis direction while the distance between the first lens group G1 and the second lens group G2 decreases, and the distance between the second lens group G2 and the third lens group G3 increases.

More specifically, upon zooming from the short focal length extremity (W) to the long focal length extremity (T), the first lens group G1 first moves toward the image side and thereafter moves toward the object side, the second lens group G2 moves monotonically toward the object side, and the third lens group G3 moves toward the image side while plotting a convex moving path that faces the image side.

Note that the moving path of the third lens group G3 is not limited to that shown in FIG. 33. For example, the third lens group G3 may employ a moving path which monotonically moves toward the image side, or moves toward the image side while plotting a convex moving path that faces the object side.

In each of the first through eighth numerical embodiments, the first lens group G1 is configured of a negative lens element 11 and a positive lens element 12, in that order from the object side. The positive lens element 12 is an aspherical resin lens element having an aspherical surface on each side, however, it is possible for the positive lens element 12 to only have one aspherical surface on either the object side or the image side thereof.

In each of the first through eighth numerical embodiments, the second lens group G2 is configured of a cemented lens formed from a positive lens element 21 and a negative lens element 22; and a negative lens element 23, in that order from the object side. The negative lens element 23 is an aspherical resin lens element having an aspherical surface on each side, however, it is possible for the negative lens element 23 to only have one aspherical surface on either the object side or the image side thereof.

In each of the first through eighth numerical embodiments, the third lens group G3 is configured of a single positive lens element 31. The positive lens element 31 is an aspherical resin lens element having an aspherical surface on each side, however, it is possible for the positive lens element 31 to only have one aspherical surface on either the object side or the image side thereof.

Accordingly, the zoom lens system of the present invention achieves an increase in zoom ratio to approximately 5:1 upon moving the first through third lens groups G1 through G3 along the optical axis direction to carry out a zooming. Furthermore, it is necessary to provide at least one aspherical lens element, for correcting various aberrations such as spherical aberration and distortion, in each of the first through third lens groups G1 through G3. Furthermore, the present invention achieves a lower cost by forming this aspherical lens element as a resin lens element rather than an expensive glass lens element.

Condition (1) specifies the ratio of the focal length of the entire zoom lens system at the long focal length extremity to the focal length of the second lens group G2, and achieves a favorable correction of spherical aberration and coma while enabling miniaturization of the zoom lens system.

If the upper limit of condition (1) is exceeded, the refractive power of the second lens group G2 becomes too strong, so that it becomes difficult to correct spherical aberration and coma over the entire zooming range (from the short focal length extremity to the long focal length extremity).

If the lower limit of condition (1) is exceeded, the refractive power of the second lens group G2 becomes too weak, so that due to an increase in the amount of movement of the second lens group G2 along the optical axis during zooming, it becomes difficult to achieve a miniaturized zoom lens system.

Condition (2) specifies the ratio of the focal length of the first lens group G1 to the focal length of the second lens group G2, and achieves favorable correction of abaxial chromatic aberration while achieving miniaturization of the zoom lens system.

If the upper limit of condition (2) is exceeded, the refractive power of the first lens group G1 becomes too strong, so that it becomes difficult to correct abaxial aberrations, especially at the short focal length extremity.

If the lower limit of condition (2) is exceeded, the refractive power of the first lens group G1 becomes too weak, so that since the thickness (in the optical axis direction) of the first lens group G1 increases due to the diameter of the frontmost lens (first lens group G1) increasing, it becomes difficult to achieve miniaturization of the zoom lens system.

Condition (3) specifies the ratio of the focal length of the positive lens element 12 which is provided within the first lens group G1 to the focal length of the negative lens element 23 which is provided on the image side within the second lens group G2, and is for suppressing the influence of focal fluctuations caused by changes in the shape of the resin lens element and the refractive index due to a change in temperature.

In the zoom lens system of the present invention, by employing a resin lens element for the positive lens element 12 provided within the first lens group G1 and employing a resin lens element for the negative lens element 23 provided on the image side within the second lens group G2, in regard to the focal fluctuations that occur upon a change in temperature, the focal fluctuations that occur at the positive lens element 12 provided in the first lens group G1 is cancelled out by the focal fluctuations that occur in the negative lens element 23 provided on the image side within the second lens group G2. Hence, the zoom lens system of the present invention is configured in such a manner as to reduce focal fluctuations throughout the entire zoom lens system.

If the upper limit of condition (3) is exceeded, the refractive power of the positive lens element 12 provided in the first lens group G1 becomes too strong, so that the adverse influence of the focal fluctuation at the positive lens element 12 provided in the first lens group G1, upon a change in temperature, remains.

If the lower limit of condition (3) is exceeded, the refractive power of the negative lens element 23 which is provided on the image side within the second lens group G2 becomes too strong, so that the adverse influence of the focal fluctuation at the negative lens element 23 provided on the image side within the second lens group G2, upon a change in temperature, remains.

Condition (4) specifies the ratio of the focal length of the positive lens element 12 which is provided within the first lens group G1 to the focal length of the first lens group G1, and is for suppressing a change in field curvature upon a change in temperature and is for favorably correcting chromatic aberration at the long focal length extremity.

If the upper limit of condition (4) is exceeded, the refractive power of the positive lens element 12 provided in the first lens group G1 becomes too strong, so that the change in field curvature, via the positive lens element 12 provided within the first lens group G1 due to a change in temperature, increases, so that the optical quality undesirably deteriorates.

If the lower limit of condition (4) is exceeded, the refractive power of the positive lens element 12 provided in the first lens group G1 becomes too weak, so that correction of chromatic aberration becomes difficult, especially at the long focal length extremity.

Condition (5) specifies the shape (shape factor) of the negative lens element 23 which is provided on the image side within the second lens group G2, and achieves favorable correction of coma and astigmatism, and also enables the miniaturization of the zoom lens system.

If the upper limit of condition (5) is exceeded, the divergence effect of the negative lens element 23, provided on the image side within the second lens group G2, on the abaxial light rays reduces, so that miniaturization of the zoom lens system becomes difficult.

If the lower limit of condition (5) is exceeded, the radius of curvature of the surface on the image side of the negative lens element 23 which is provided on the image side within the second lens group G2 becomes too small, so that it becomes difficult to correct coma and astigmatism.

Condition (6) specifies the refractive index at the d-line of the positive lens element 21 which is provided in the second lens group G2, and achieves a favorable optical quality by correcting the Petzval sum.

If the lower limit of condition (6) is exceeded, the correction of the Petzval sum becomes insufficient, so that a favorable optical quality cannot be attained.

Condition (7) specifies the Abbe number with respect to the d-line of the negative lens element 22 which is provided on the object side within the second lens group G2, and is for reducing the chromatic aberration that occurs at the second lens group G2.

In the zoom lens system, it is necessary to correct, to some extent, the chromatic aberration that individually occurs at each lens group since zooming is carried out by moving each lens group along the optical axis thereof. In particular, since the amount of movement of the second lens group G2 increases and aberration fluctuations also increase upon an increase in the zoom ratio, it becomes necessary to sufficiently decrease the chromatic aberrations in the second lens group G2.

If the upper limit of condition (7) is exceeded, it becomes difficult to correct axial chromatic aberration throughout the entire zooming range.

Condition (8) specifies the ratio of the lateral magnification of the second lens group G2 when focused on an object at infinity at the long focal length extremity to the lateral magnification of the second lens group G2 when focused on an object at infinity at the short focal length extremity. Condition (9) specifies the ratio of the lateral magnification of the third lens group G3 when focused on an object at infinity at the long focal length extremity to the lateral magnification of the third lens group G3 when focused on an object at infinity at the short focal length extremity. Both of conditions (8) and (9) are for appropriately determining the refractive powers and the movement amounts along the optical axis of the second lens group G2 and the third lens group G3, upon the zoom ratio being increased.

The second lens group G2 increases the lateral magnification by moving along the optical axis toward the object side from the short focal length extremity to the long focal length extremity. If the upper limit of condition (8) is exceeded, the burden of zooming on the second lens group G2 becomes too great, so that the amount of movement of the second lens group G2 along the optical axis during zooming becomes large, making it difficult to miniaturize the zoom lens system. Although it is possible to miniaturize the zoom lens system by increasing the refractive power of the second lens group G2 in order to reduce the amount of movement thereof during zooming, it becomes difficult to correct aberrations over the entire zooming range from the short focal length extremity to the long focal length extremity, so that a favorable optical quality cannot be attained. If the lower limit of condition (8) is exceeded, the increase in lateral magnification of the second lens group G2 from the short focal length extremity to the long focal length extremity becomes small, so that it becomes difficult to attain a desired zoom ratio.

The third lens group G3 increases the lateral magnification by moving along the optical axis toward the image side from the short focal length extremity to the long focal length extremity. If the upper limit of condition (9) is exceeded, the amount of movement of the third lens group G3 increases, so that the backfocus at the long focal length extremity becomes insufficient. Although it is possible to avoid an insufficient backfocus if the refractive power of the third lens group G3 is strengthened, it becomes difficult to suppress the change in field curvature that occurs during a focusing operation toward a close-distance object, at the long focal length extremity. If the lower limit of condition (9) is exceeded, the increase in the lateral magnification of the third lens group G3 from the short focal length extremity to the long focal length extremity becomes small, so that either a desired zoom ratio becomes difficult to attain, or the burden of zooming on the second lens group G2 increases, thereby causing an increase in the amount of movement of the second lens group G2 during zooming, so that miniaturization of the zoom lens system becomes difficult.

In the zoom lens system of the present invention, the third lens group G3 constitutes a focusing lens group which is moved along the optical axis toward the object side with respect to a close-distance object. By configuring the third lens group G3 from a biconvex single resin lens element 31 having a positive refractive power, a lower cost and a lightweight focusing lens group can be achieved. Furthermore, by forming an aspherical surface on at least one side of the biconvex single resin lens element 31, which constitutes the third lens group G3, it possible to reduce deterioration in the optical quality during focusing toward a close-distance object.

Embodiments

Specific numerical embodiments will be herein discussed. In the aberration diagrams and the tables, the d-line, g-line and C-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index at the d-line, and vd designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity.

An aspherical surface which is rotationally symmetrical about the optical axis is defined as:

$$x=cy^2/(1+[1-\{1+K\}c^2y^2]^{1/2})+A4y^4+A6y^6+A8y^8+A10y^{10}+A12y^{12}\ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

The lens arrangement in each of the first through eighth numerical embodiments are the same. Therefore, only the details of the lens arrangement for the first numerical embodiment will be described hereinbelow, and the lens arrangements for the second through eighth numerical embodiments are omitted.

Furthermore, in each of the first through eighth numerical embodiments, a relatively large amount of negative (barrel) distortion is allowed to occur at the short focal length extremity, distortion at the intermediate focal length and at the long focal length extremity are suppressed, and the distortion is corrected at the short focal length extremity by image-processing image data that has been captured by an electronic image sensor. Hence, the effective imaging range, i.e., the image height is different at the short focal length extremity, and at the intermediate focal length and the long focal length extremity.

Embodiment 1

Figure 1:
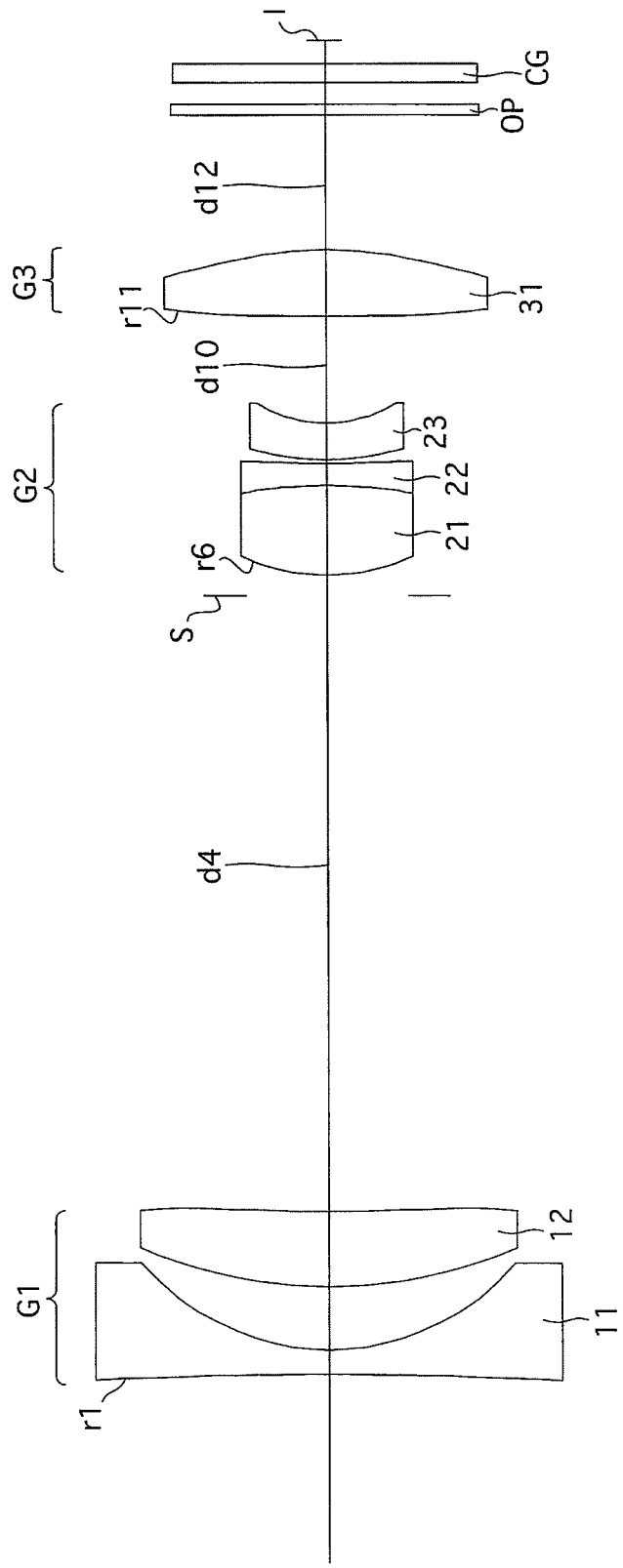
FIG. 1 shows a lens arrangement of a first numerical embodiment of a zoom lens system, according to the present invention, at the short focal length extremity when focused on an object at infinity.

FIGS. 1 through 4D and Tables 1 through 4 show a first numerical embodiment of a zoom lens system according to the present invention. FIG. 1 shows a lens arrangement of the first numerical embodiment of the zoom lens system at the short focal length extremity when focused on an object at infinity. FIGS. 2A, 2B, 2C and 2D show various aberrations that occurred in the lens arrangement shown in FIG. 1 when focused on an object at infinity at the short focal length extremity. FIGS. 3A, 3B, 3C and 3D show various aberrations that occurred in the lens arrangement shown in FIG. 1 when focused on an object at infinity at an intermediate focal length. FIGS. 4A, 4B, 4C and 4D show various aberrations that occurred in the lens arrangement shown in FIG. 1 when focused on an object at infinity at the long focal length extremity. Table 1 shows the lens surface data, Table 2 shows various zoom lens system data, Table 3 shows the aspherical surface data, and Table 4 shows the lens group data of the zoom lens system according to the first numerical embodiment.

The zoom lens system of the first numerical embodiment is configured of a negative first lens group G1, a positive second lens group G2, and a positive third lens group G3, in that order from the object side. The third lens group G3 constitutes a focusing lens group, which is moved along the optical axis during a focusing operation (focusing is performed by advancing the third lens group G3 toward the object side upon focusing on an object at infinity to an object at a finite distance).

The first lens group G1 (surface Nos. 1 through 4) is configured of a biconcave negative lens element 11 and a positive meniscus lens element 12 having a convex surface on the object side, in that order from the object side. The positive meniscus lens element 12 is a resin lens element having an aspherical surface on each side thereof.

The second lens group G2 (surface Nos. 6 through 10) is configured of a cemented lens formed from a biconvex positive lens element 21 and a biconcave negative lens element 22; and a negative meniscus lens element 23 having a convex surface on the object side, in that order from the object side. The negative meniscus lens element 23 is a resin lens element having an aspherical surface formed on each side thereof. A diaphragm S (surface No. 5) is provided between the first lens group G1 and the second lens group G2 and moves integrally with the second lens group G2 during zooming.

The third lens group G3 (surface Nos. 11 and 12) is configured of a single biconvex positive lens element 31. This biconvex positive lens element 31 is provided with an aspherical surface on each side thereof. An optical filter OP (surface Nos. 13 and 14) and a cover glass CG (surface Nos. 15 and 16) are provided behind (and in front of an imaging plane I) the third lens group G3 (biconvex positive lens element 31).

TABLE 1

SURFACE DATA

| Surf .No. | r | d | N(d) | vd |
|---|---|---|---|---|
| 1 | −129.549 | 0.700 | 1.72916 | 54.7 |
| 2 | 6.809 | 1.699 | | |
| 3* | 13.132 | 2.021 | 1.63550 | 23.9 |
| 4* | 44.831 | d4 | | |
| 5(Diaphragm) | ∞ | 0.550 | | |
| 6 | 5.854 | 2.430 | 1.88300 | 40.8 |
| 7 | −13.731 | 0.600 | 1.92286 | 20.9 |
| 8 | 38.640 | 0.100 | | |
| 9* | 6.760 | 1.000 | 1.60641 | 27.2 |
| 10* | 3.700 | d10 | | |
| 11* | 94.241 | 1.799 | 1.54358 | 55.7 |
| 12* | −10.707 | d12 | | |
| 13 | ∞ | 0.300 | 1.51680 | 64.2 |
| 14 | ∞ | 0.560 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 2

ZOOM LENS SYSTEM DATA
Zoom Ratio 4.83

| | Short Focal Length Extremity | Intermediate Focal Length | Long Focal Length Extremity |
|---|---|---|---|
| FNO. | 3.2 | 4.9 | 6.6 |
| f | 4.70 | 10.30 | 22.70 |
| W | 42.5 | 21.9 | 10.2 |
| Y | 3.59 | 4.08 | 4.08 |
| fB | 0.59 | 0.59 | 0.59 |
| L | 36.20 | 31.72 | 38.11 |
| d4 | 16.683 | 5.948 | 0.468 |

TABLE 2-continued

ZOOM LENS SYSTEM DATA
Zoom Ratio 4.83

|  | Short Focal Length Extremity | Intermediate Focal Length | Long Focal Length Extremity |
|---|---|---|---|
| d10 | 2.880 | 10.190 | 22.840 |
| d12 | 3.631 | 2.574 | 1.800 |

TABLE 3

Aspherical Surface Data:

| Surf. No. | K | A4 | A6 | A8 | A10 |
|---|---|---|---|---|---|
| 3 | 0.000 | −0.7595E−04 | −0.3901E−05 | 0.3832E−06 | −0.6623E−08 |
| 4 | 0.000 | −0.3230E−03 | −0.8712E−05 | 0.5671E−06 | −0.1337E−07 |
| 9 | 0.000 | −0.1422E−02 | 0.9709E−04 | −0.4081E−04 | 0.2999E−05 |
| 10 | 0.000 | −0.1198E−03 | 0.4058E−03 | −0.1218E−03 | 0.1145E−04 |
| 11 | 0.000 | 0.5009E−03 | −0.6443E−04 | 0.4986E−05 | −0.1210E−06 |
| 12 | 0.000 | 0.1104E−02 | −0.1069E−03 | 0.7053E−05 | −0.1577E−06 |

TABLE 4

LENS GROUP DATA

| Lens Group | 1$^{st}$ Surf. | Focal Length |
|---|---|---|
| 1 | 1 | −13.69 |
| 2 | 6 | 10.51 |
| 3 | 11 | 17.80 |

Embodiment 2

Figure 5:
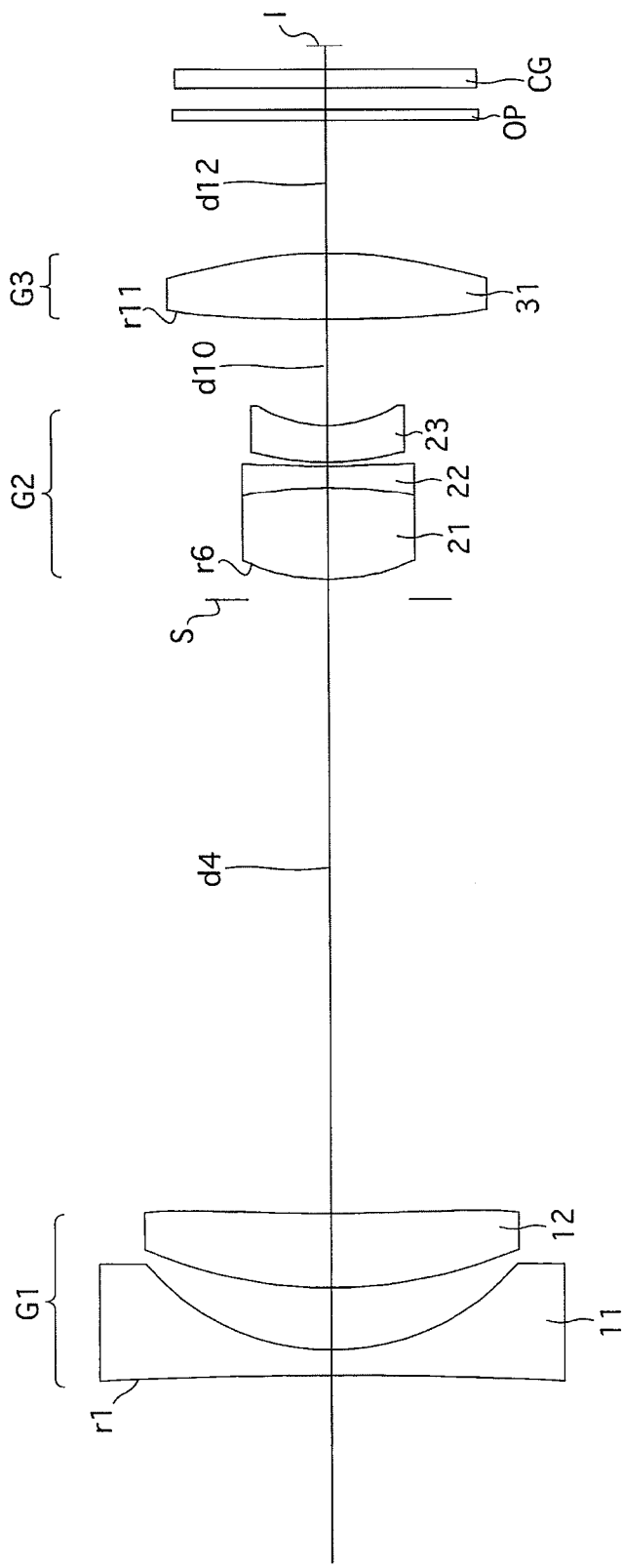
FIG. 5 shows a lens arrangement of a second numerical embodiment of a zoom lens system, according to the present invention, at the short focal length extremity when focused on an object at infinity.

FIGS. 5 through 8D and Tables 5 through 8 show a second numerical embodiment of a zoom lens system according to the present invention. FIG. 5 shows a lens arrangement of the second numerical embodiment of the zoom lens system at the short focal length extremity when focused on an object at infinity. FIGS. 6A, 6B, 6C and 6D show various aberrations that occurred in the lens arrangement shown in FIG. 5 when focused on an object at infinity at the short focal length extremity. FIGS. 7A, 7B, 7C and 7D show various aberrations that occurred in the lens arrangement shown in FIG. 1 when focused on an object at infinity at an intermediate focal length. FIGS. 8A, 8B, 8C and 8D show various aberrations that occurred in the lens arrangement shown in FIG. 5 when focused on an object at infinity at the long focal length extremity. Table 5 shows the lens surface data, Table 6 shows various zoom lens system data, Table 7 shows the aspherical surface data, and Table 8 shows the lens group data of the zoom lens system according to the second numerical embodiment.

TABLE 5

SURFACE DATA

| Surf. No. | r | d | N(d) | vd |
|---|---|---|---|---|
| 1 | −135.138 | 0.700 | 1.72916 | 54.7 |
| 2 | 6.798 | 1.696 | | |
| 3* | 13.444 | 2.019 | 1.63550 | 23.9 |
| 4* | 47.758 | d4 | | |
| 5(Diaphragm) | ∞ | 0.550 | | |
| 6 | 5.832 | 2.474 | 1.88300 | 40.8 |
| 7 | −13.646 | 0.600 | 1.92286 | 20.9 |
| 8 | 41.779 | 0.100 | | |

TABLE 5-continued

SURFACE DATA

| Surf. No. | r | d | N(d) | vd |
|---|---|---|---|---|
| 9* | 7.223 | 1.000 | 1.60641 | 27.2 |
| 10* | 3.784 | d10 | | |
| 11* | 64.052 | 1.790 | 1.54358 | 55.7 |
| 12* | −11.426 | d12 | | |
| 13 | ∞ | 0.300 | 1.51680 | 64.2 |

TABLE 5-continued

SURFACE DATA

| Surf. No. | r | d | N(d) | vd |
|---|---|---|---|---|
| 14 | ∞ | 0.560 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 6

ZOOM LENS SYSTEM DATA
Zoom Ratio 4.83

|  | Short Focal Length Extremity | Intermediate Focal Length | Long Focal Length Extremity |
|---|---|---|---|
| FNO. | 3.3 | 4.9 | 6.6 |
| f | 4.70 | 10.30 | 22.70 |
| W | 42.5 | 21.9 | 10.2 |
| Y | 3.59 | 4.08 | 4.08 |
| fB | 0.59 | 0.59 | 0.59 |
| L | 36.20 | 31.43 | 38.15 |
| d4 | 16.691 | 5.677 | 0.479 |
| d10 | 2.880 | 9.818 | 22.846 |
| d12 | 3.598 | 2.907 | 1.800 |

TABLE 7

Aspherical Surface Data:

| Surf. No. | K | A4 | A6 | A8 | A10 |
|---|---|---|---|---|---|
| 3 | 0.000 | −0.3047E−04 | −0.5818E−05 | 0.5537E−06 | −0.1009E−07 |
| 4 | 0.000 | −0.3181E−03 | −0.5410E−05 | 0.4945E−06 | −0.1338E−07 |
| 9 | 0.000 | −0.1603E−02 | 0.1063E−03 | −0.3707E−04 | 0.2745E−05 |
| 10 | 0.000 | −0.2071E−03 | 0.3795E−03 | −0.1024E−03 | 0.9877E−05 |
| 11 | 0.000 | 0.2736E−03 | −0.1511E−04 | 0.1386E−05 | −0.3258E−07 |
| 12 | 0.000 | 0.7275E−03 | −0.3865E−04 | 0.2359E−05 | −0.4801E−07 |

TABLE 8

LENS GROUP DATA

| Lens Group | 1$^{st}$ Surf. | Focal Length |
|---|---|---|
| 1 | 1 | −13.65 |
| 2 | 6 | 10.50 |
| 3 | 11 | 17.99 |

Embodiment 3

Figure 9:
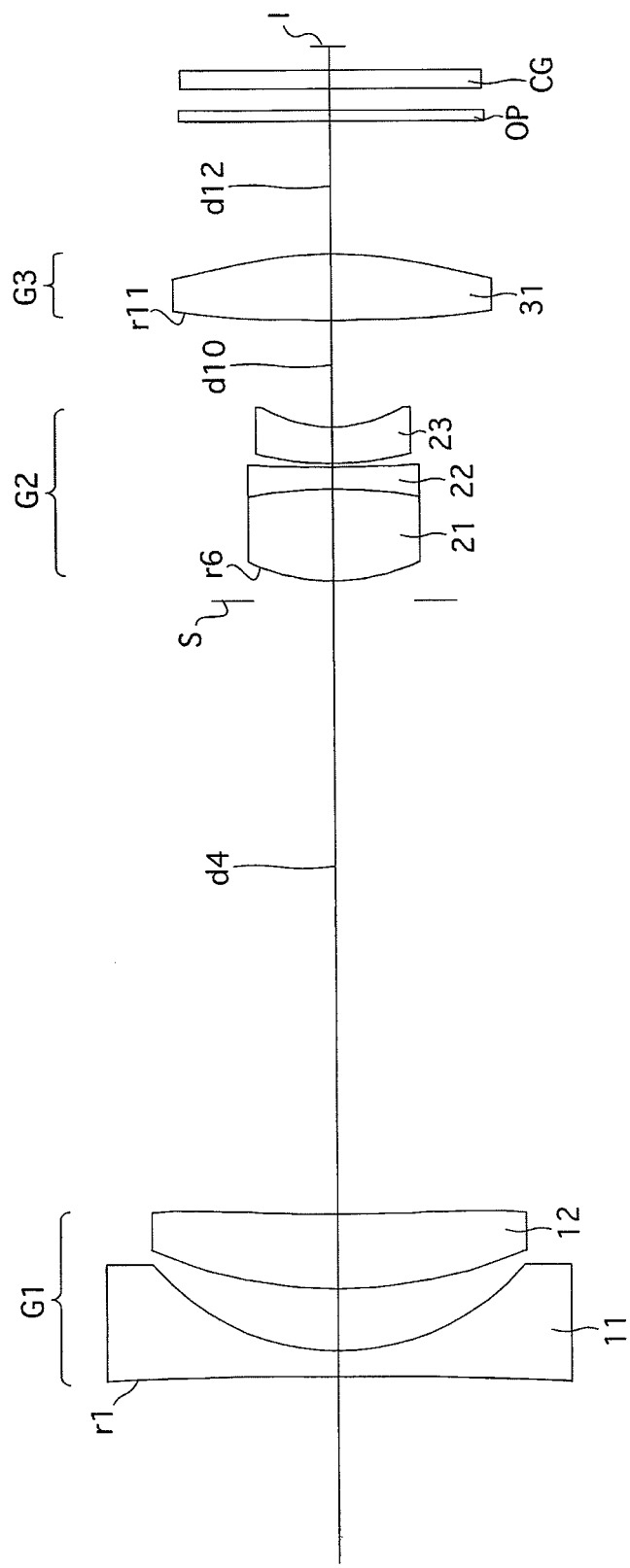
FIG. 9 shows a lens arrangement of a third numerical embodiment of a zoom lens system, according to the present invention, at the short focal length extremity when focused on an object at infinity.

FIGS. 9 through 12D and Tables 9 through 12 show a third numerical embodiment of a zoom lens system according to the present invention. FIG. 9 shows a lens arrangement of the third numerical embodiment of the zoom lens system at the short focal length extremity when focused on an object at infinity. FIGS. 10A, 10B, 10C and 10D show various aberrations that occurred in the lens arrangement shown in FIG. 9 when focused on an object at infinity at the short focal length extremity. FIGS. 11A, 11B, 11C and 11D show various aberrations that occurred in the lens arrangement shown in FIG. 9 when focused on an object at infinity at an intermediate focal length. FIGS. 12A, 12B, 12C and 12D show various aberrations that occurred in the lens arrangement shown in FIG. 9 when focused on an object at infinity at the long focal length extremity. Table 9 shows the lens surface data, Table 10 shows various zoom lens system data, Table 11 shows the aspherical surface data, and Table 12 shows the lens group data of the zoom lens system according to the third numerical embodiment.

TABLE 9

SURFACE DATA

| Surf. No. | r | d | N(d) | vd |
|---|---|---|---|---|
| 1 | −147.802 | 0.700 | 1.72916 | 54.7 |
| 2 | 6.774 | 1.698 | | |
| 3* | 13.308 | 2.021 | 1.63550 | 23.9 |
| 4* | 45.823 | d4 | | |
| 5(Diaphragm) | ∞ | 0.550 | | |
| 6 | 5.773 | 2.487 | 1.88300 | 40.8 |
| 7 | −13.876 | 0.600 | 1.92286 | 20.9 |
| 8 | 41.683 | 0.100 | | |
| 9* | 7.980 | 1.000 | 1.60641 | 27.2 |
| 10* | 3.960 | d10 | | |
| 11* | 61.964 | 1.791 | 1.54358 | 55.7 |
| 12* | −11.489 | d12 | | |
| 13 | ∞ | 0.300 | 1.51680 | 64.2 |
| 14 | ∞ | 0.560 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 10

ZOOM LENS SYSTEM DATA
Zoom Ratio 4.83

| | Short Focal Length Extremity | Intermediate Focal Length | Long Focal Length Extremity |
|---|---|---|---|
| FN0. | 3.2 | 4.8 | 6.6 |
| f | 4.70 | 10.30 | 22.70 |
| W | 42.5 | 21.9 | 10.2 |
| Y | 3.59 | 4.08 | 4.08 |
| fB | 0.59 | 0.59 | 0.59 |
| L | 36.20 | 31.42 | 38.17 |
| d4 | 16.693 | 5.667 | 0.487 |
| d10 | 2.880 | 9.796 | 22.853 |
| d12 | 3.592 | 2.924 | 1.800 |

TABLE 11

Aspherical Surface Data:

| Surf. No. | K | A4 | A6 | A8 | A10 |
|---|---|---|---|---|---|
| 3 | 0.000 | −0.3398E−04 | −0.5261E−05 | 0.5544E−06 | −0.1079E−07 |
| 4 | 0.000 | −0.3253E−03 | −0.4045E−05 | 0.4373E−06 | −0.1304E−07 |
| 9 | 0.000 | −0.1333E−02 | 0.2376E−04 | −0.9724E−05 | 0.1323E−06 |
| 10 | 0.000 | 0.3975E−03 | 0.2326E−03 | −0.3450E−04 | 0.2229E−05 |
| 11 | 0.000 | 0.2030E−03 | 0.3813E−05 | −0.1642E−07 | 0.3173E−08 |
| 12 | 0.000 | 0.6001E−03 | −0.1210E−04 | 0.5220E−06 | −0.3568E−08 |

TABLE 12

LENS GROUP DATA

| Lens Group | 1st Surf. | Focal Length |
|---|---|---|
| 1 | 1 | -13.64 |
| 2 | 6 | 10.50 |
| 3 | 11 | 17.98 |

Embodiment 4

Figure 13:
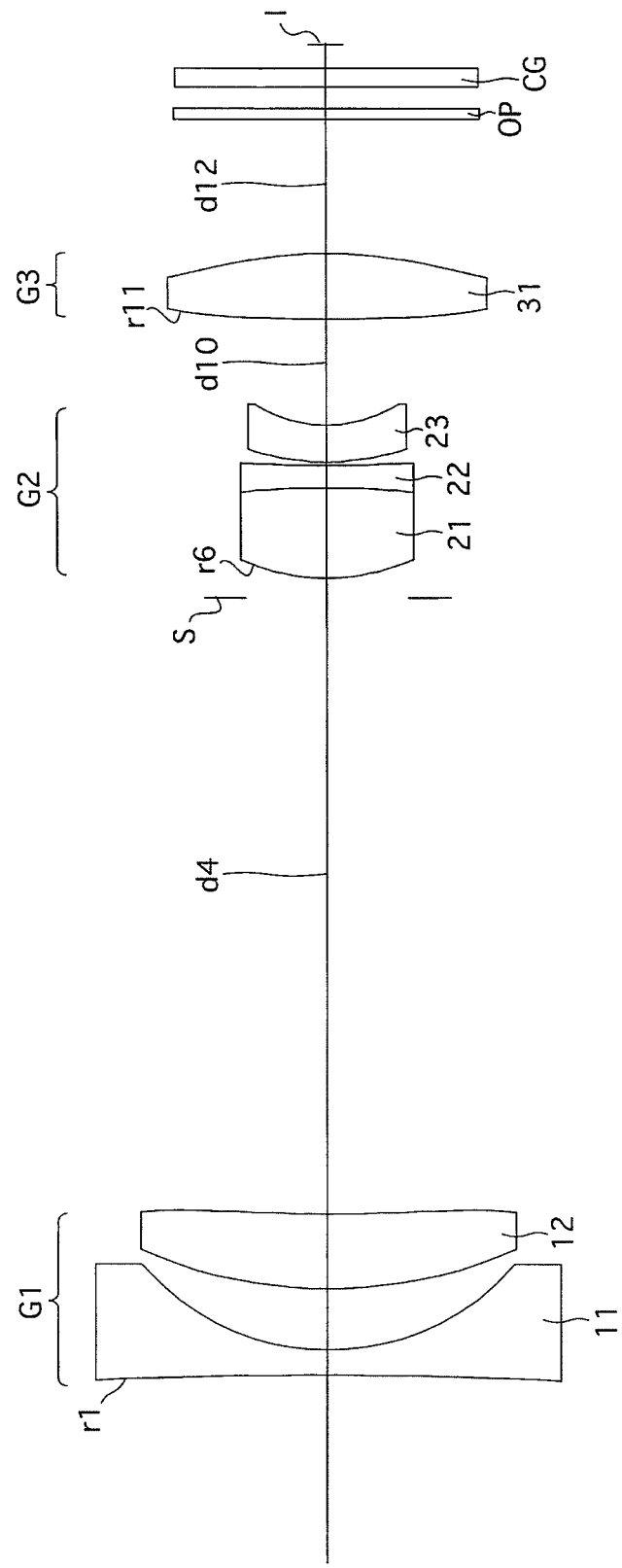
FIG. 13 shows a lens arrangement of a fourth numerical embodiment of a zoom lens system, according to the present invention, at the short focal length extremity when focused on an object at infinity.

FIGS. 13 through 16D and Tables 13 through 16 show a fourth numerical embodiment of a zoom lens system according to the present invention. FIG. 13 shows a lens arrangement of the fourth numerical embodiment of the zoom lens system at the short focal length extremity when focused on an object at infinity. FIGS. 14A, 14B, 14C and 14D show various aberrations that occurred in the lens arrangement shown in FIG. 13 when focused on an object at infinity at the short focal length extremity. FIGS. 15A, 15B, 15C and 15D show various aberrations that occurred in the lens arrangement shown in FIG. 13 when focused on an object at infinity at an intermediate focal length. FIGS. 16A, 16B, 16C and 16D show various aberrations that occurred in the lens arrangement shown in FIG. 13 when focused on an object at infinity at the long focal length extremity. Table 13 shows the lens surface data, Table 14 shows various zoom lens system data, Table 15 shows the aspherical surface data, and Table 16 shows the lens group data of the zoom lens system according to the fourth numerical embodiment.

TABLE 13

SURFACE DATA

| Surf. No. | r | d | N(d) | vd |
|---|---|---|---|---|
| 1 | -139.334 | 0.700 | 1.72916 | 54.7 |
| 2 | 6.776 | 1.679 | | |
| 3* | 13.147 | 2.029 | 1.63550 | 23.9 |
| 4* | 44.810 | d4 | | |
| 5(Diaphragm) | ∞ | 0.550 | | |
| 6 | 5.868 | 2.462 | 1.88300 | 40.8 |
| 7 | -22.871 | 0.600 | 1.94594 | 18.0 |
| 8 | 31.952 | 0.100 | | |
| 9* | 6.400 | 1.000 | 1.60641 | 27.2 |
| 10* | 3.732 | d10 | | |
| 11* | 64.025 | 1.780 | 1.54358 | 55.7 |
| 12* | -11.511 | d12 | | |
| 13 | ∞ | 0.300 | 1.51680 | 64.2 |
| 14 | ∞ | 0.560 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 14

ZOOM LENS SYSTEM DATA
Zoom Ratio 4.83

| | Short Focal Length Extremity | Intermediate Focal Length | Long Focal Length Extremity |
|---|---|---|---|
| FNO. | 3.3 | 4.8 | 6.6 |
| f | 4.70 | 10.30 | 22.70 |
| W | 42.5 | 21.9 | 10.2 |
| Y | 3.59 | 4.08 | 4.08 |
| fB | 0.59 | 0.59 | 0.59 |
| L | 36.20 | 31.43 | 38.16 |
| d4 | 16.697 | 5.676 | 0.495 |
| d10 | 2.880 | 9.811 | 22.866 |
| d12 | 3.624 | 2.943 | 1.800 |

TABLE 15

Aspherical Surface Data:

| Surf. No. | K | A4 | A6 | A8 | A10 |
|---|---|---|---|---|---|
| 3 | 0.000 | -0.2862E-05 | -0.6802E-05 | 0.5711E-06 | -0.1073E-07 |
| 4 | 0.000 | -0.2916E-03 | -0.6262E-05 | 0.4845E-06 | -0.1338E-07 |
| 9 | 0.000 | -0.1230E-02 | 0.7415E-04 | -0.3317E-04 | 0.2221E-05 |
| 10 | 0.000 | 0.2382E-03 | 0.3256E-03 | -0.8919E-04 | 0.7581E-05 |
| 11 | 0.000 | 0.2032E-03 | 0.8979E-05 | -0.1514E-06 | 0.2612E-08 |
| 12 | 0.000 | 0.6549E-03 | -0.1586E-04 | 0.9629E-06 | -0.1670E-07 |

TABLE 16

LENS GROUP DATA

| Lens Group | 1st Surf. | Focal Length |
|---|---|---|
| 1 | 1 | -13.64 |
| 2 | 6 | 10.50 |
| 3 | 11 | 18.10 |

Embodiment 5

Figure 17:
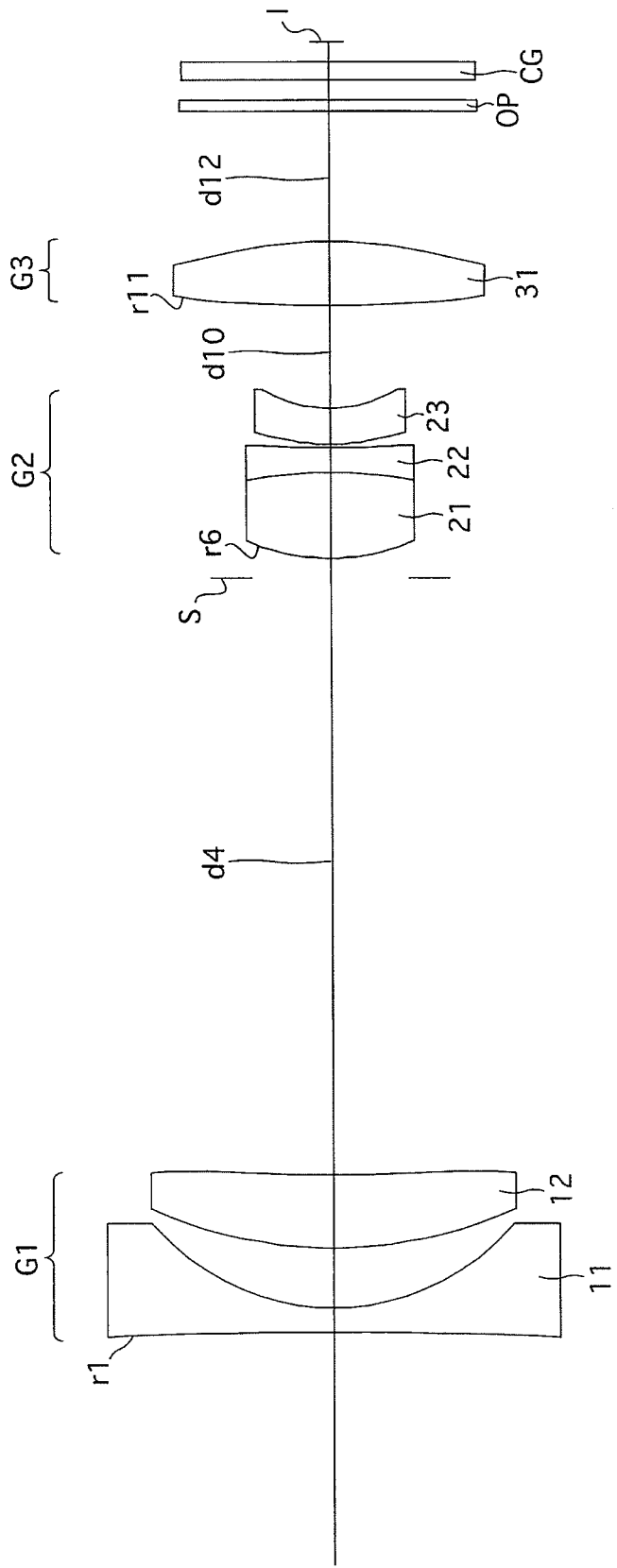
FIG. 17 shows a lens arrangement of a fifth numerical embodiment of a zoom lens system, according to the present invention, at the short focal length extremity when focused on an object at infinity.

FIGS. 17 through 20D and Tables 17 through 20 show a fifth numerical embodiment of a zoom lens system according to the present invention. FIG. 17 shows a lens arrangement of the fifth numerical embodiment of the zoom lens system at the short focal length extremity when focused on an object at infinity. FIGS. 18A, 18B, 18C and 18D show various aberrations that occurred in the lens arrangement shown in FIG. 17 when focused on an object at infinity at the short focal length extremity. FIGS. 19A, 19B, 19C and 19D show various aberrations that occurred in the lens arrangement shown in FIG. 17 when focused on an object at infinity at an intermediate focal length. FIGS. 20A, 20B, 20C and 20D show various aberrations that occurred in the lens arrangement shown in FIG. 17 when focused on an object at infinity at the long focal length extremity. Table 17 shows the lens surface data, Table 18 shows various zoom lens system data, Table 19 shows the aspherical surface data, and Table 20 shows the lens group data of the zoom lens system according to the fifth numerical embodiment.

TABLE 17

SURFACE DATA

| Surf. No. | r | d | N(d) | vd |
|---|---|---|---|---|
| 1 | −154.675 | 0.700 | 1.72916 | 54.7 |
| 2 | 6.745 | 1.670 | | |
| 3* | 12.843 | 2.030 | 1.63550 | 23.9 |
| 4* | 41.491 | d4 | | |
| 5(Diaphragm) | ∞ | 0.550 | | |
| 6 | 5.893 | 2.390 | 1.88300 | 40.8 |
| 7 | −14.350 | 0.700 | 1.92286 | 20.9 |
| 8 | 31.828 | 0.100 | | |
| 9* | 6.507 | 1.000 | 1.60641 | 27.2 |
| 10* | 3.785 | d10 | | |
| 11* | 65.578 | 1.780 | 1.54358 | 55.7 |
| 12* | −11.420 | d12 | | |
| 13 | ∞ | 0.300 | 1.51680 | 64.2 |
| 14 | ∞ | 0.560 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 18

ZOOM LENS SYSTEM DATA
Zoom Ratio 4.83

| | Short Focal Length Extremity | Intermediate Focal Length | Long Focal Length Extremity |
|---|---|---|---|
| FNO. | 3.3 | 4.9 | 6.6 |
| f | 4.70 | 10.30 | 22.70 |
| W | 42.5 | 21.9 | 10.2 |
| Y | 3.59 | 4.08 | 4.08 |
| fB | 0.59 | 0.59 | 0.59 |
| L | 37.62 | 32.85 | 39.62 |
| d4 | 16.694 | 5.676 | 0.518 |
| d10 | 2.880 | 9.796 | 22.879 |
| d12 | 3.622 | 2.960 | 1.799 |

TABLE 19

Aspherical Surface Data:

| Surf. No. | K | A4 | A6 | A8 | A10 |
|---|---|---|---|---|---|
| 3 | 0.000 | −0.4389E−05 | −0.6608E−05 | 0.5661E−06 | −0.1073E−07 |
| 4 | 0.000 | −0.2930E−03 | −0.5990E−05 | 0.4727E−06 | −0.1334E−07 |
| 9 | 0.000 | −0.1172E−02 | 0.8110E−04 | −0.3398E−04 | 0.2279E−05 |
| 10 | 0.000 | 0.3265E−03 | 0.3387E−03 | −0.9067E−04 | 0.7777E−05 |
| 11 | 0.000 | 0.2356E−03 | 0.4818E−05 | 0.8105E−07 | −0.5322E−08 |
| 12 | 0.000 | 0.6869E−03 | −0.1900E−04 | 0.1143E−05 | −0.2409E−07 |

TABLE 20

LENS GROUP DATA

| Lens Group | 1$^{st}$ Surf. | Focal Length |
|---|---|---|
| 1 | 1 | −13.63 |
| 2 | 6 | 10.50 |
| 3 | 11 | 18.04 |

Embodiment 6

Figure 21:
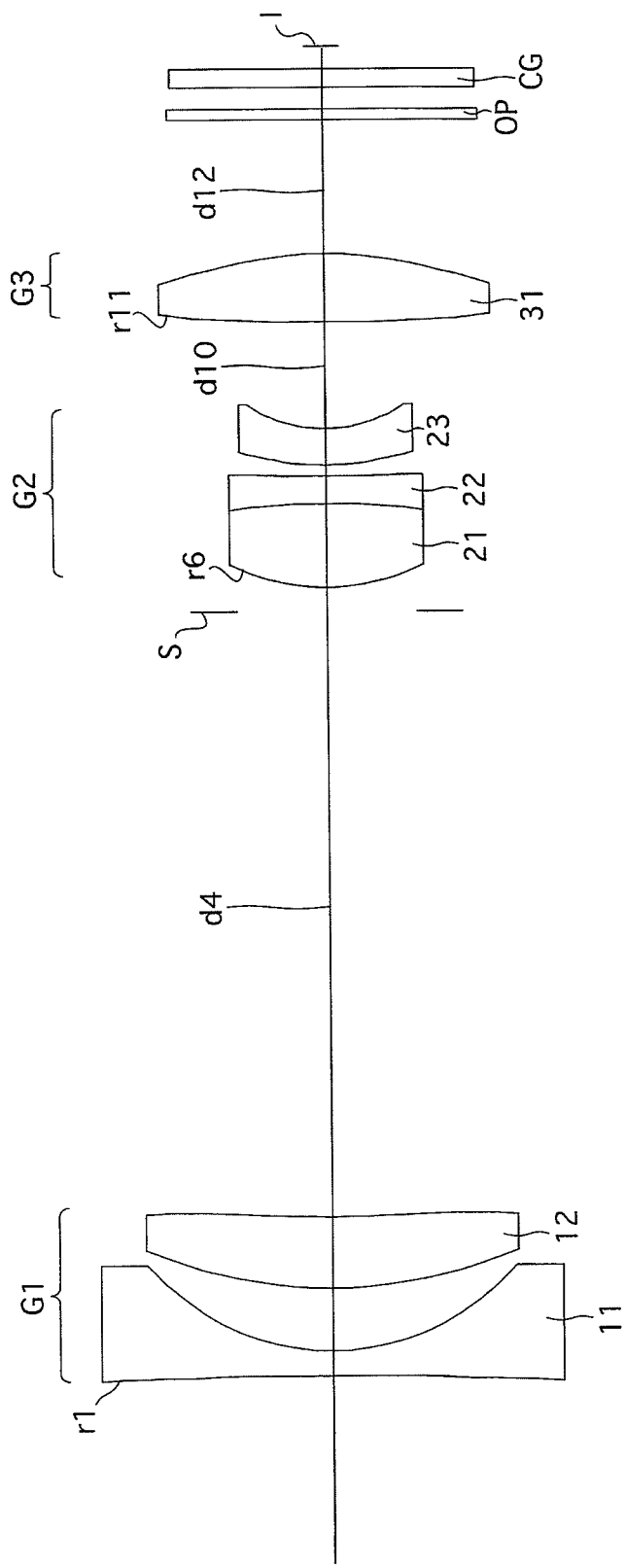
FIG. 21 shows a lens arrangement of a sixth numerical embodiment of a zoom lens system, according to the present invention, at the short focal length extremity when focused on an object at infinity.

FIGS. 21 through 24D and Tables 21 through 24 show a sixth numerical embodiment of a zoom lens system according to the present invention. FIG. 21 shows a lens arrangement of the sixth numerical embodiment of the zoom lens system at the short focal length extremity when focused on an object at infinity. FIGS. 22A, 22B, 22C and 22D show various aberrations that occurred in the lens arrangement shown in FIG. 21 when focused on an object at infinity at the short focal length extremity. FIGS. 23A, 23B, 23C and 23D show various aberrations that occurred in the lens arrangement shown in FIG.

21 when focused on an object at infinity at an intermediate focal length. FIGS. 24A, 24B, 24C and 24D show various aberrations that occurred in the lens arrangement shown in FIG. 21 when focused on an object at infinity at the long focal length extremity. Table 21 shows the lens surface data, Table 22 shows various zoom lens system data, Table 23 shows the aspherical surface data, and Table 24 shows the lens group data of the zoom lens system according to the sixth numerical embodiment.

TABLE 21

SURFACE DATA

| Surf. No. | r | d | Nd | vd |
|---|---|---|---|---|
| 1 | −147.609 | 0.700 | 1.72916 | 54.7 |
| 2 | 6.732 | 1.692 | | |
| 3* | 12.535 | 1.930 | 1.63550 | 23.9 |
| 4* | 37.051 | d4 | | |
| 5(Diaphragm) | ∞ | 0.650 | | |
| 6 | 6.035 | 2.280 | 1.88300 | 40.8 |
| 7 | −19.954 | 0.740 | 2.00272 | 19.3 |
| 8 | 64.149 | 0.299 | | |
| 9* | 7.382 | 1.000 | 1.63550 | 23.9 |
| 10* | 4.015 | d10 | | |
| 11* | 146.897 | 1.830 | 1.54358 | 55.7 |
| 12* | −10.149 | d12 | | |
| 13 | ∞ | 0.300 | 1.51680 | 64.2 |
| 14 | ∞ | 0.560 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 22

ZOOM LENS SYSTEM DATA
Zoom Ratio 4.83

| | Short Focal Length Extremity | Intermediate Focal Length | Long Focal Length Extremity |
|---|---|---|---|
| FNO. | 3.6 | 5.4 | 6.0 |
| f | 4.70 | 10.30 | 22.70 |
| W | 42.5 | 21.9 | 10.2 |
| Y | 3.59 | 4.08 | 4.08 |
| fB | 0.59 | 0.59 | 0.59 |
| L | 36.20 | 32.12 | 38.80 |
| d4 | 16.472 | 6.028 | 0.610 |
| d10 | 2.895 | 10.375 | 23.184 |
| d12 | 3.626 | 2.506 | 1.800 |

TABLE 23

Aspherical Surface Data:

| Surf. No. | K | A4 | A6 | A8 | A10 |
|---|---|---|---|---|---|
| 3 | 0.000 | −0.1840E−03 | 0.2586E−05 | 0.1919E−06 | −0.5208E−08 |
| 4 | 0.000 | −0.4095E−03 | −0.3670E−05 | 0.4065E−06 | −0.1229E−07 |
| 9 | 2.090 | −0.1583E−02 | −0.9607E−04 | −0.8475E−06 | −0.2494E−06 |
| 10 | −0.110 | 0.7766E−03 | 0.6135E−04 | −0.1587E−04 | 0.1434E−05 |
| 11 | 0.000 | 0.4522E−03 | −0.3210E−04 | 0.2814E−05 | −0.7709E−07 |
| 12 | 0.000 | 0.9701E−03 | −0.5396E−04 | 0.3894E−05 | −0.9832E−07 |

TABLE 24

LENS GROUP DATA

| Lens Group | 1st Surf. | Focal Length |
|---|---|---|
| 1 | 1 | −13.43 |
| 2 | 6 | 10.51 |
| 3 | 11 | 17.54 |

Embodiment 7

Figure 25:
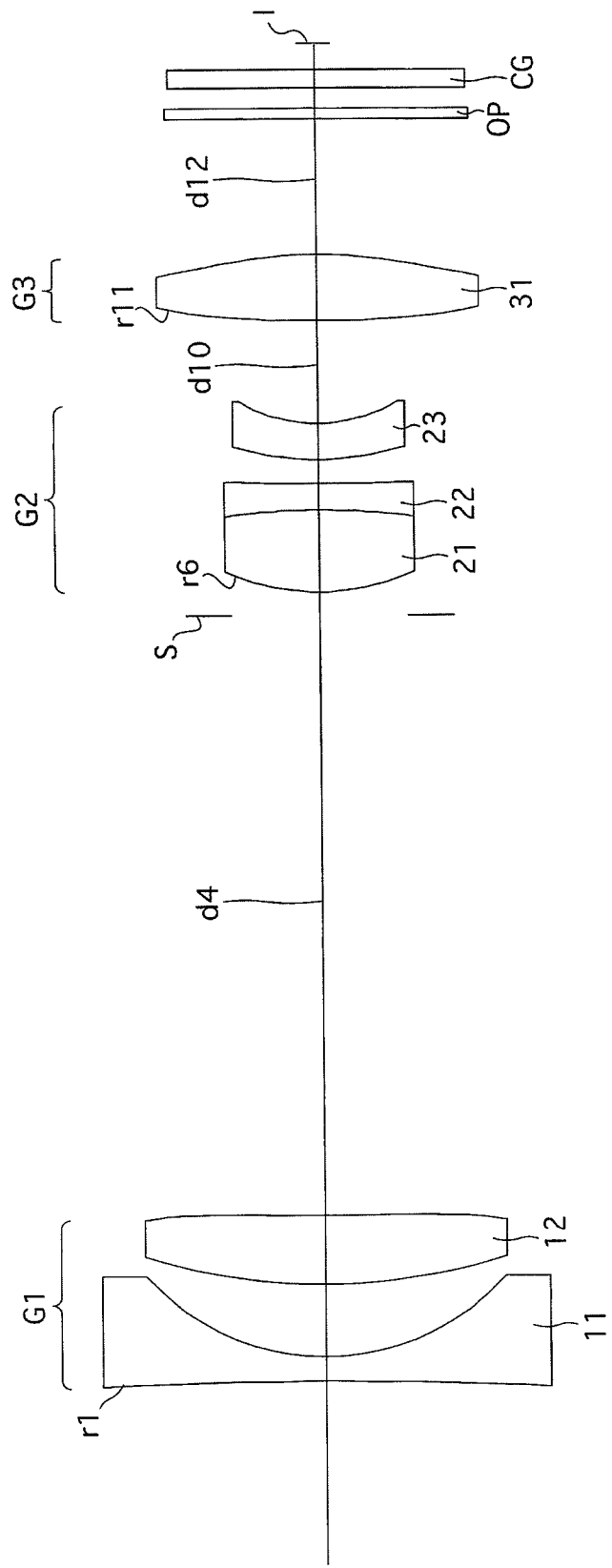
FIG. 25 shows a lens arrangement of a seventh numerical embodiment of a zoom lens system, according to the present invention, at the short focal length extremity when focused on an object at infinity.

FIGS. 25 through 28D and Tables 25 through 28 show a seventh numerical embodiment of a zoom lens system according to the present invention. FIG. 25 shows a lens arrangement of the seventh numerical embodiment of the zoom lens system at the short focal length extremity when focused on an object at infinity. FIGS. 26A, 26B, 26C and 26D show various aberrations that occurred in the lens arrangement shown in FIG. 25 when focused on an object at infinity at the short focal length extremity. FIGS. 27A, 27B, 27C and 27D show various aberrations that occurred in the lens arrangement shown in FIG. 25 when focused on an object at infinity at an intermediate focal length. FIGS. 28A, 28B, 28C and 28D show various aberrations that occurred in the lens arrangement shown in FIG. 25 when focused on an object at infinity at the long focal length extremity. Table 25 shows the lens surface data, Table 26 shows various zoom lens system data, Table 27 shows the aspherical surface data, and Table 28 shows the lens group data of the zoom lens system according to the seventh numerical embodiment.

TABLE 25

SURFACE DATA

| Surf. No. | r | d | N(d) | vd |
|---|---|---|---|---|
| 1 | −135.883 | 0.700 | 1.72916 | 54.7 |
| 2 | 6.777 | 2.025 | | |
| 3* | 16.290 | 1.930 | 1.63550 | 23.9 |
| 4* | 91.631 | d4 | | |
| 5(Diaphragm) | ∞ | 0.650 | | |
| 6 | 6.486 | 2.280 | 1.88300 | 40.8 |
| 7 | −19.667 | 0.740 | 2.00272 | 19.3 |
| 8 | 53.847 | 0.679 | | |
| 9* | 7.624 | 1.000 | 1.63550 | 23.9 |
| 10* | 4.575 | d10 | | |
| 11* | 51.619 | 1.830 | 1.54358 | 55.7 |

TABLE 25-continued

SURFACE DATA

| Surf. No. | r | d | N(d) | vd |
|---|---|---|---|---|
| 12* | −12.118 | d12 | | |
| 13 | ∞ | 0.300 | 1.51680 | 64.2 |
| 14 | ∞ | 0.560 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 26

ZOOM LENS SYSTEM DATA
Zoom Ratio 4.72

| | Short Focal Length Extremity | Intermediate Focal Length | Long Focal Length Extremity |
|---|---|---|---|
| FNO. | 3.5 | 5.3 | 6.0 |
| f | 4.70 | 10.00 | 22.20 |
| W | 42.5 | 22.6 | 10.4 |
| Y | 3.59 | 4.08 | 4.08 |
| fB | 0.59 | 0.59 | 0.59 |
| L | 37.20 | 32.95 | 39.54 |
| d4 | 16.660 | 6.128 | 0.418 |
| d10 | 2.859 | 10.219 | 23.391 |
| d12 | 3.750 | 2.676 | 1.800 |

TABLE 27

Aspherical Surface Data:

| Surf. No. | K | A4 | A6 | A8 | A10 |
|---|---|---|---|---|---|
| 3 | 0.000 | −0.1174E−03 | 0.5039E−06 | 0.2271E−06 | −0.6072E−08 |
| 4 | 0.000 | −0.3576E−03 | −0.4429E−05 | 0.3568E−06 | −0.1108E−07 |
| 9 | 3.129 | −0.1283E−02 | −0.1059E−03 | −0.3405E−06 | −0.5529E−06 |
| 10 | −0.021 | 0.1161E−02 | 0.2788E−04 | −0.7900E−05 | 0.3064E−06 |
| 11 | 0.000 | 0.5854E−03 | −0.3847E−04 | 0.3002E−05 | −0.7604E−07 |
| 12 | 0.000 | 0.1064E−02 | −0.6464E−04 | 0.4366E−05 | −0.1052E−06 |

TABLE 28

LENS GROUP DATA

| Lens Group | 1st Surf. | Focal Length |
|---|---|---|
| 1 | 1 | −13.47 |
| 2 | 6 | 10.87 |
| 3 | 11 | 18.24 |

Embodiment 8

Figure 29:
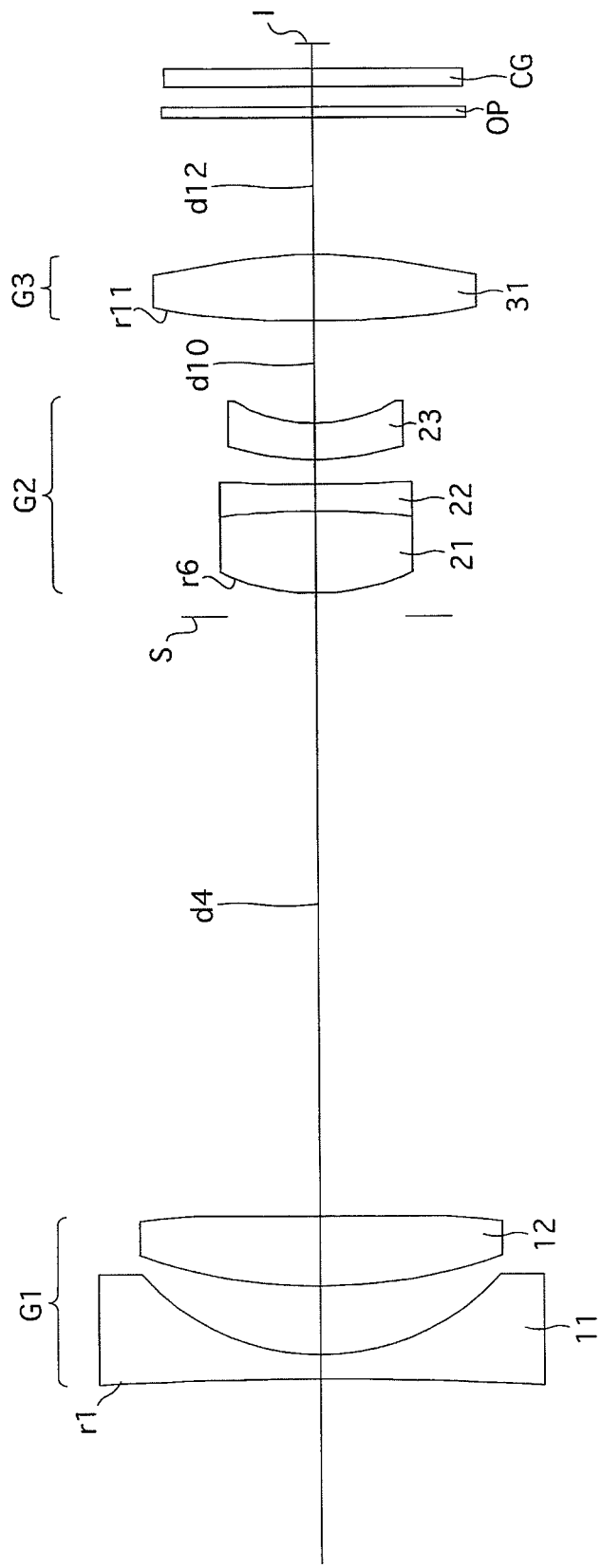
FIG. 29 shows a lens arrangement of a eighth numerical embodiment of a zoom lens system, according to the present invention, at the short focal length extremity when focused on an object at infinity.

FIGS. 29 through 32D and Tables 29 through 32 show an eighth numerical embodiment of a zoom lens system according to the present invention. FIG. 29 shows a lens arrangement of the eighth numerical embodiment of the zoom lens system at the short focal length extremity when focused on an object at infinity. FIGS. 30A, 30B, 30C and 30D show various aberrations that occurred in the lens arrangement shown in FIG. 29 when focused on an object at infinity at the short focal length extremity. FIGS. 31A, 31B, 31C and 31D show various aberrations that occurred in the lens arrangement shown in FIG. 29 when focused on an object at infinity at an intermediate focal length. FIGS. 32A, 32B, 32C and 32D show various aberrations that occurred in the lens arrangement shown in FIG. 29 when focused on an object at infinity at the long focal length extremity. Table 29 shows the lens surface data, Table 30 shows various zoom lens system data, Table 31 shows the aspherical surface data, and Table 32 shows the lens group data of the zoom lens system according to the eighth numerical embodiment.

TABLE 29

SURFACE DATA

| Surf. No. | r | d | N(d) | vd |
|---|---|---|---|---|
| 1 | −117.193 | 0.700 | 1.75500 | 52.3 |
| 2 | 6.806 | 1.920 | | |
| 3* | 15.850 | 1.930 | 1.63550 | 23.9 |
| 4* | 134.772 | d4 | | |
| 5(Diaphragm) | ∞ | 0.650 | | |
| 6 | 6.547 | 2.280 | 1.88300 | 40.8 |
| 7 | −23.983 | 0.740 | 1.94594 | 18.0 |
| 8 | 43.225 | 0.696 | | |
| 9* | 7.698 | 1.000 | 1.63550 | 23.9 |
| 10* | 4.633 | d10 | | |
| 11* | 47.365 | 1.830 | 1.54358 | 55.7 |
| 12* | −12.336 | d12 | | |
| 13 | ∞ | 0.300 | 1.51680 | 64.2 |
| 14 | ∞ | 0.560 | | |

TABLE 29-continued

SURFACE DATA

| Surf. No. | r | d | N(d) | vd |
|---|---|---|---|---|
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 30

ZOOM LENS SYSTEM DATA
Zoom Ratio 4.72

| | Short Focal Length Extremity | Intermediate Focal Length | Long Focal Length Extremity |
|---|---|---|---|
| FNO. | 3.5 | 5.3 | 6.0 |
| f | 4.70 | 10.00 | 22.20 |
| W | 42.5 | 22.5 | 10.4 |
| Y | 3.59 | 4.08 | 4.08 |
| fB | 0.59 | 0.59 | 0.59 |

TABLE 30-continued

ZOOM LENS SYSTEM DATA
Zoom Ratio 4.72

|  | Short Focal Length Extremity | Intermediate Focal Length | Long Focal Length Extremity |
|---|---|---|---|
| L | 37.20 | 33.06 | 39.88 |
| d4 | 16.691 | 6.169 | 0.550 |
| d10 | 2.858 | 10.255 | 23.671 |
| d12 | 3.789 | 2.776 | 1.800 |

TABLE 31

Aspherical Surface Data:

| Surf. No. | K | A4 | A6 | A8 | A10 |
|---|---|---|---|---|---|
| 3 | 0.000 | −0.6469E−04 | 0.8968E−06 | 0.2215E−06 | −0.5423E−08 |
| 4 | 0.000 | −0.3177E−03 | −0.4275E−05 | 0.3587E−06 | −0.1090E−07 |
| 9 | 3.247 | −0.1384E−02 | −0.1091E−03 | 0.3803E−06 | −0.5841E−06 |
| 10 | −0.040 | 0.1035E−02 | 0.1902E−04 | −0.6432E−05 | 0.2487E−06 |
| 11 | 0.000 | 0.5933E−03 | −0.3927E−04 | 0.3051E−05 | −0.7615E−07 |
| 12 | 0.000 | 0.1087E−02 | −0.6513E−04 | 0.4372E−05 | −0.1043E−06 |

TABLE 32

LENS GROUP DATA

| Lens Group | 1$^{st}$ Surf. | Focal Length |
|---|---|---|
| 1 | 1 | −13.41 |
| 2 | 6 | 10.93 |
| 3 | 11 | 18.20 |

The numerical values of each condition for each embodiment are shown in Table 33.

TABLE 33

|  | Embod. 1 | Embod. 2 | Embod. 3 | Embod. 4 |
|---|---|---|---|---|
| Cond. (1) | 2.16 | 2.16 | 2.16 | 2.16 |
| Cond. (2) | −1.30 | −1.30 | −1.30 | −1.30 |
| Cond. (3) | −1.86 | −1.96 | −2.01 | −1.66 |
| Cond. (4) | −2.08 | −2.11 | −2.11 | −2.09 |
| Cond. (5) | 3.42 | 3.20 | 2.97 | 3.80 |
| Cond. (6) | 1.883 | 1.883 | 1.883 | 1.883 |
| Cond. (7) | 20.9 | 20.9 | 20.9 | 18.0 |
| Cond. (8) | 4.21 | 4.22 | 4.23 | 4.22 |
| Cond. (9) | 1.15 | 1.14 | 1.14 | 1.14 |
|  | Embod. 5 | Embod. 6 | Embod. 7 | Embod. 8 |
| Cond. (1) | 2.16 | 2.16 | 2.04 | 2.03 |
| Cond. (2) | −1.30 | −1.28 | −1.24 | −1.23 |
| Cond. (3) | −1.64 | −1.85 | −1.50 | −1.34 |
| Cond. (4) | −2.09 | −2.15 | −2.29 | −2.09 |
| Cond. (5) | 3.78 | 3.38 | 4.00 | 4.02 |
| Cond. (6) | 1.883 | 1.883 | 1.883 | 1.883 |
| Cond. (7) | 20.9 | 19.3 | 19.3 | 18.0 |
| Cond. (8) | 4.22 | 4.20 | 4.09 | 4.07 |
| Cond. (9) | 1.14 | 1.15 | 1.16 | 1.16 |

As can be understood from Table 33, the first through eighth numerical embodiments satisfy conditions (1) through (9). Furthermore, as can be understood from the aberration diagrams, the various aberrations are favorably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group and a positive third lens group, in that order from the object side,
   wherein upon zooming from the short focal length extremity to the long focal length extremity, each of said first through third lens groups move along the optical axis of the zoom lens system so that the distance between said first lens group and said second lens group decreases, and the distance between said second lens group and said third lens group increases,
   wherein said first lens group consists of a negative lens element and a positive lens element, in that order from the object side,
   wherein said second lens group includes a cemented lens including a positive lens element and a negative lens element, and a negative lens element, in that order from the object side, and
   wherein the following conditions are satisfied:

$1.8 < ft/f2 < 2.4$, $-1.5 < f1/f2 < -1.2$, wherein ft designates the focal length of the entire said zoom lens system at the long focal length extremity,
   f1 designates the focal length of said first lens group, and
   f2 designates the focal length of said second lens group.

2. The zoom lens system according to claim 1, wherein the positive lens element of said first lens group is a resin lens element having an aspherical surface on at least one side thereof, and wherein the negative lens element on the image side within said second lens group is a resin lens element having an aspherical surface on at least one side thereof.

3. The zoom lens system according to claim 2, wherein the following condition is satisfied:

$-2.5 < f12/f23 < -1.3$, wherein f12 designates the focal length of said positive lens element which is provided in said first lens group, and
   f23 designates the focal length of said negative lens element which is provided on the image side within said second lens group.

4. The zoom lens system according to claim 2, wherein the following condition is satisfied:

$-2.4 < f12/f1 < -1.8$, wherein f12 designates the focal length of said positive lens element which is provided in said first lens group, and
   f1 designates the focal length of said first lens group.

5. The zoom lens system according to claim 2, wherein the following condition is satisfied:

$$2.5 < (ra23+rb23)/(ra23-rb23) < 4.5, \text{wherein}$$

ra23 designates the radius of curvature of the surface on the object side of said negative lens element which is provided on the image side within said second lens group, and rb23 designates the radius of curvature of the surface on the image side of said negative lens element which is provided on the image side within said second lens group.

6. The zoom lens system according to claim 2, wherein the following conditions are satisfied:

$$1.8 < n21, \text{ and}$$

$$v22 < 22, \text{wherein}$$

n21 designates a refractive index at the d-line of said positive lens element which is provided in said second lens group, and v22 designates an Abbe number with respect to the d-line of the negative lens element which is provided on the object side within said second lens group.

7. The zoom lens system according to claim 2, wherein said third lens group moves toward the image side upon zooming from the short focal length extremity to the long focal length extremity, and wherein the following conditions are satisfied:

$$4.0 < m2t/m2w < 5.0, \text{ and}$$

$$1.05 < m3t/m3w < 1.25, \text{wherein}$$

m2t designates a lateral magnification of said second lens group when focused on an object at infinity, at the long focal length extremity, m2w designates a lateral magnification of said second lens group when focused on an object at infinity, at the short focal length extremity, m3t designates a lateral magnification of said third lens group when focused on an object at infinity, at the long focal length extremity, and m3w designates a lateral magnification of said third lens group when focused on an object at infinity, at the short focal length extremity.

8. The zoom lens system according to claim 1, wherein said third lens group is a focusing lens group which is moved along the optical axis direction during a focusing operation, and comprises a single biconvex positive resin lens element having an aspherical surface on at least one side thereof.

9. An electronic imaging apparatus comprising said zoom lens system according to claim 1.

10. A zoom lens system comprising a negative first lens group, a positive second lens group and a positive third lens group, in that order from the object side,
wherein upon zooming from the short focal length extremity to the long focal length extremity, each of said first through third lens groups move along the optical axis of the zoom lens system so that the distance between said first lens group and said second lens group decreases, and the distance between said second lens group and said third lens group increases,
wherein said first lens group includes a negative lens element and a positive lens element, in that order from the object side,
wherein said second lens group includes a cemented lens including a positive lens element and a negative lens element, and a negative lens element, in that order from the object side, and
wherein the following conditions are satisfied:

$$1.8 < ft/f2 < 2.4,$$

$$-1.5 < f1/f2 < -1.2,$$

$$2.5 < (ra23+rb23)/(ra23-rb23) < 4.5, \text{wherein}$$

ft designates the focal length of the entire zoom lens system at the long focal length extremity, f1 designates the focal length of said first lens group, f2 designates the focal length of said second lens group, ra23 designates the radius of curvature of the surface on the object side of said negative lens element which is provided on the image side within said second lens group, and rb23 designates the radius of curvature of the surface on the image side of said negative lens element which is provided on the image side within said second lens group, wherein the positive lens element of said first lens group is a resin lens element having an aspherical surface on at least one side thereof, and wherein the negative lens element on the image side within said second lens group is a resin lens element having an aspherical surface on at least one side thereof.

11. The zoom lens system according to claim 10, wherein said third lens group is a focusing lens group which is moved along the optical axis direction during a focusing operation, and comprises a single biconvex positive resin lens element having an aspherical surface on at least one side thereof.

12. A zoom lens system comprising a negative first lens group, a positive second lens group and a positive third lens group, in that order from the object side,
wherein upon zooming from the short focal length extremity to the long focal length extremity, each of said first through third lens groups move along the optical axis of the zoom lens system so that the distance between said first lens group and said second lens group decreases, and the distance between said second lens group and said third lens group increases,
wherein said first lens group includes a negative lens element and a positive lens element, in that order from the object side,
wherein said second lens group includes a cemented lens including a positive lens element and a negative lens element, and a negative lens element, in that order from the object side, and
wherein the following conditions are satisfied:

$$1.8 < ft/f2 < 2.4,$$

$$-1.5 < f1/f2 < -1.2,$$

$$1.8 < n21, \text{ and}$$

$$v22 < 22, \text{wherein}$$

ft designates the focal length of the entire zoom lens system at the long focal length extremity, f1 designates the focal length of said first lens group, f2 designates the focal length of said second lens group, n21 designates a refractive index at the d-line of said positive lens element which is provided in said second lens group, and v22 designates an Abbe number with respect to the d-line of the negative lens element which is provided on the object side within said second lens group, wherein the positive lens element of said first lens group is a resin lens element having an aspherical surface on at least one side thereof, and wherein the negative lens element in the image side within said second lens group is a resin lens element having an aspherical surface on at least one side thereof.

13. The zoom lens system according to claim 12, wherein said third lens group is a focusing lens group which is moved along the optical axis direction during a focusing operation, and comprises a single biconvex positive resin lens element having an aspherical surface on at least one side thereof.

14. A zoom lens system comprising a negative first lens group, a positive second lens group and a positive third lens group, in that order from the object side,
   wherein upon zooming from the short focal length extremity to the long focal length extremity, each of said first through third lens groups move along the optical axis of the zoom lens system so that the distance between said first lens group and said second lens group decreases, and the distance between said second lens group and said third lens group increases,
   wherein said first lens group includes a negative lens element and a positive lens element, in that order from the object side,
   wherein said second lens group includes a cemented lens including a positive lens element and a negative lens element, and a negative lens element, in that order from the object side, and
   wherein the following conditions are satisfied:

$1.8 < ft/f2 < 2.4$, $-1.5 < f1/f2 < -1.2$, $4.0 < m2t/m2w < 5.0$, and $1.05 < m3t/m3w < 1.25$, wherein ft designates the focal length of the entire zoom lens system at the long focal length extremity,
f1 designates the focal length of said first lens group,
f2 designates the focal length of said second lens group,
m2t designates a lateral magnification of said second lens group when focused on an object at infinity, at the long focal length extremity,
m2w designates a lateral magnification of said second lens group when focused on an object at infinity, at the short focal length extremity,
m3t designates a lateral magnification of said third lens group when focused on an object at infinity, at the long focal length extremity, and
m3w designates a lateral magnification of said third lens group when focused on an object at infinity, at the short focal length extremity,
wherein the positive lens element of said first lens group is a resin lens element having an aspherical surface on at least one side thereof, and wherein the negative lens element on the image side within said second lens group is a resin lens element having an aspherical surface on at least one side thereof.

15. The zoom lens system according to claim 14, wherein said third lens group is a focusing lens group which is moved along the optical axis direction during a focusing operation, and comprises a single biconvex positive resin lens element having an aspherical surface on at least one side thereof.

* * * * *